United States Patent
Sanchez Cembellin et al.

(10) Patent No.: US 7,489,634 B2
(45) Date of Patent: Feb. 10, 2009

(54) METHOD AND SYSTEM FOR CONTROLLING TRAFFIC LOAD BETWEEN MEDIA GATEWAY CONTROLLERS AND PROXIES

(75) Inventors: Jose Antonio Sanchez Cembellin, Madrid (ES); Manuel Cardeno Triano, Fuentes de Leon (ES)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 592 days.

(21) Appl. No.: 10/498,749

(22) PCT Filed: Oct. 5, 2002

(86) PCT No.: PCT/EP02/11194

§ 371 (c)(1),
(2), (4) Date: Jul. 15, 2005

(87) PCT Pub. No.: WO03/056767

PCT Pub. Date: Jul. 10, 2003

(65) Prior Publication Data

US 2006/0193259 A1  Aug. 31, 2006

(30) Foreign Application Priority Data

Dec. 26, 2001  (EP) .................................. 01205159

(51) Int. Cl.
*H04L 12/26* (2006.01)
(52) U.S. Cl. .................. 370/231; 370/232; 370/233
(58) Field of Classification Search .................. 370/231, 370/232, 235, 352–356, 389, 466, 467
See application file for complete search history.

(56) References Cited

FOREIGN PATENT DOCUMENTS

EP  0948168 A  10/1999

(Continued)

OTHER PUBLICATIONS

M. Handley et al: "RFC 2543: SIP: Session Initiation Protocol" IETF—Request for Comments, Online! Mar. 1999, pp. 131-132, XP002199599.

(Continued)

*Primary Examiner*—Chirag G Shah
*Assistant Examiner*—Otis L Thompson, Jr.

(57) ABSTRACT

The invention refers a method of regulating the traffic that may be used between a SIP User Agent (SIP-UA) and a SIP Proxy in high traffic load situations, like in a telephony-SIP inter-working senario where the MGC in the inter-working gateway is acting as a SIP-UA. Thus, a method to fit the traffic between these two nodes into some margins which suit both node capabilities. The method comprises two procedures. The first procedure proposes a mechanism for any of both nodes, so called requesting node, to indicate the opposite node to act upon its traffic towards the requesting node. The reference for such decision is the current traffic being received at the requesting node at that very same moment. Any further traffic regulation indication will be related to the corresponding traffic level at the moment every new indication is issued, not necessarily being related to the traffic level being handled as previous indications were sent. This first procedure is the basic flow control protection between both nodes. The second procedure adds some fine controls to the first procedure. It allows both nodes to explicitly exchange capability values that will be used from that point on as a reference for any indication to act upon the traffic among both nodes. So, this second procedure provides a more permanent reference for any successive traffic regulation indication. The first procedure allows both nodes to control the traffic between them without knowing anything about each other's capabilities.

23 Claims, 10 Drawing Sheets

FOREIGN PATENT DOCUMENTS

WO      WO 9959299 A     11/1999

OTHER PUBLICATIONS

Henning Schulzrinne: "Comparison of H.323 and SIP" Internet Homepage, Online! Nov. 30, 1998, xp002199600.

"H.245: Control Protocol for Multimedia communication (May 1999)" 'Online! May 1, 1999, International Telecommunications Union, Geneva, Switzerland XP002199601.

Hartmut Wigttig et al: "Network Layer Scaling: Congestion Control in Multimedia Communication with Heterogenous Networks and Receivers" Multimedia Transport and Teleservices Nov. 13-15, 1994, pp. 274-299, XP000585306 Berlin ISBN: 3-540-58759-4.

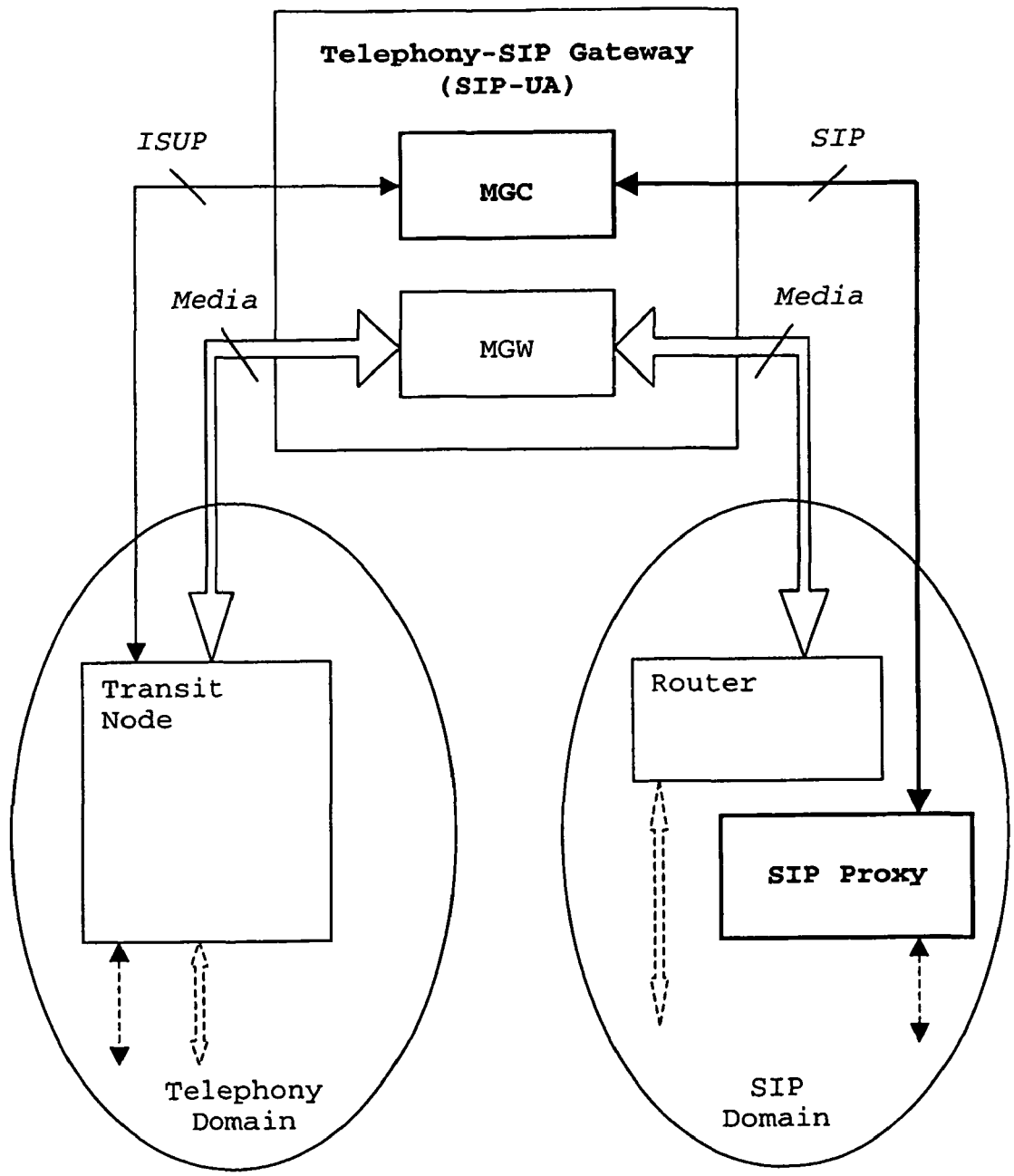
FIG.-1-
Related art

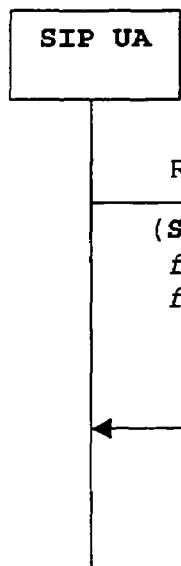
FIG.-2a-
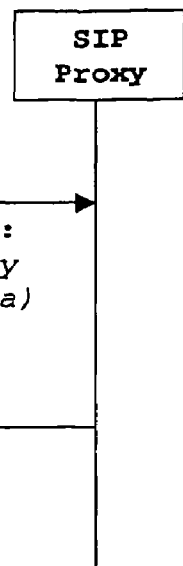
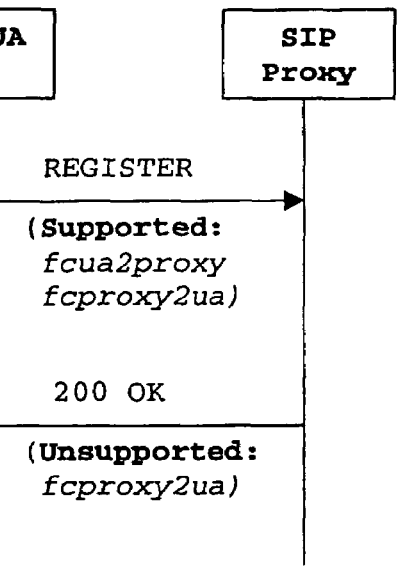
FIG.-2b-
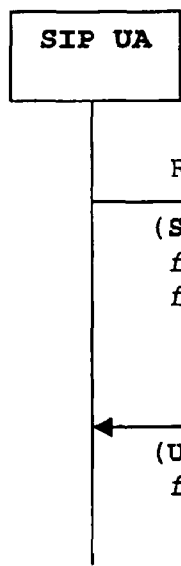
FIG.-2c-
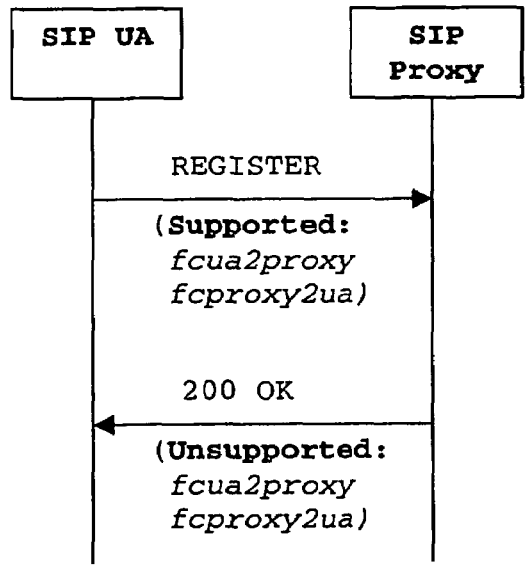
FIG.-2d-

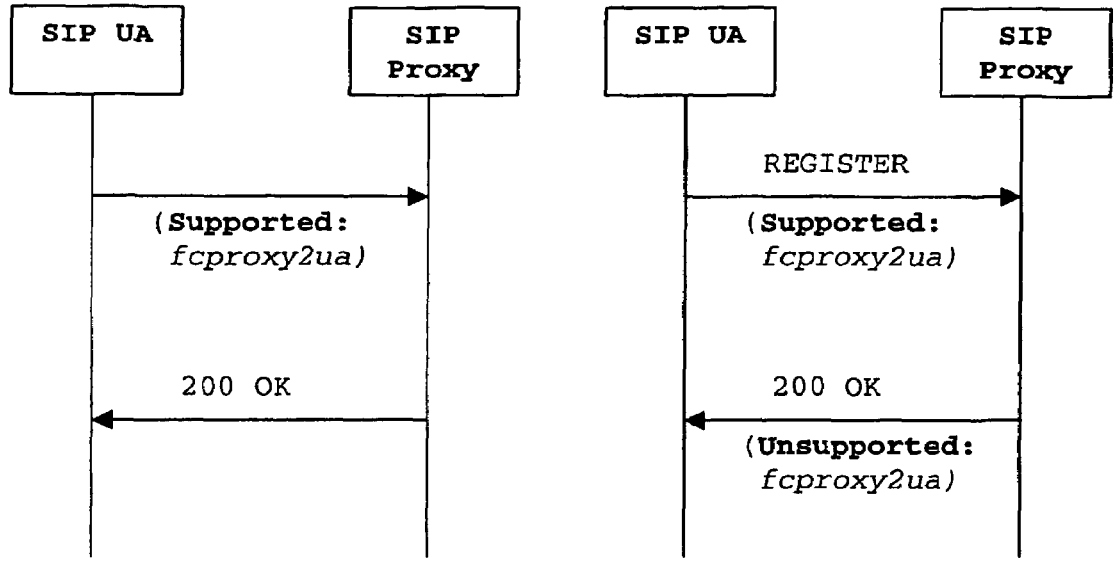
FIG.-3a-   FIG.-3b-
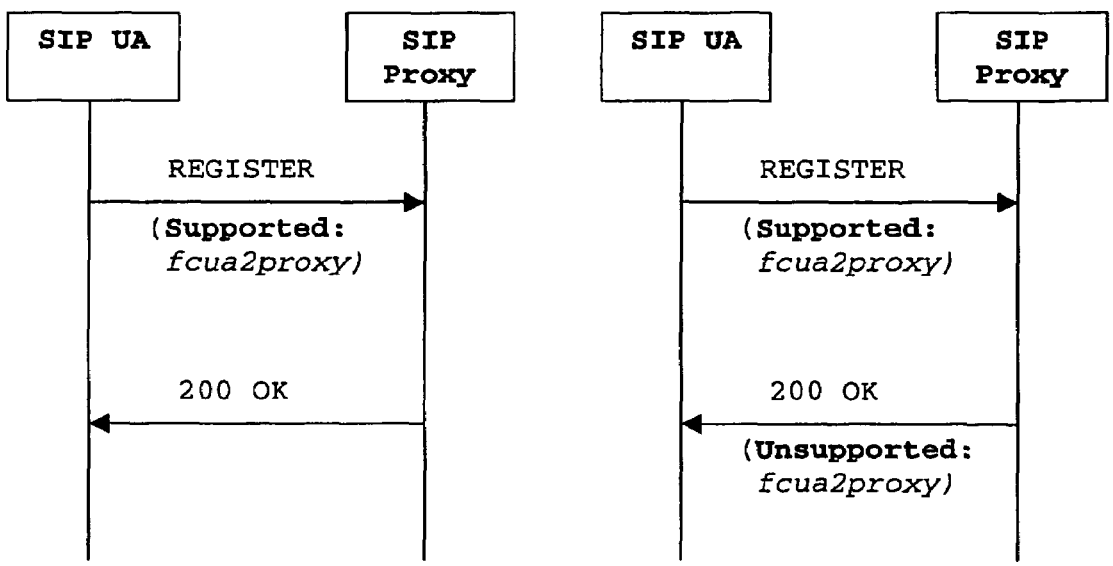
FIG.-3c-   FIG.-3d-

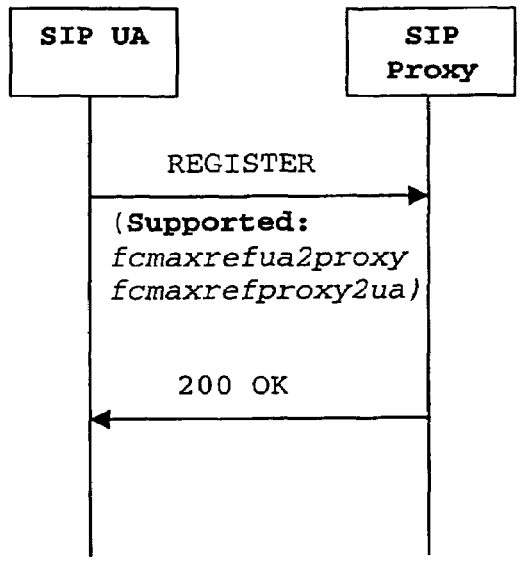
FIG.-4a-
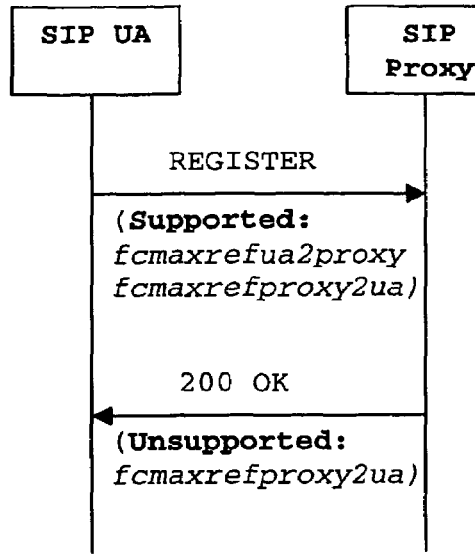
FIG.-4b-
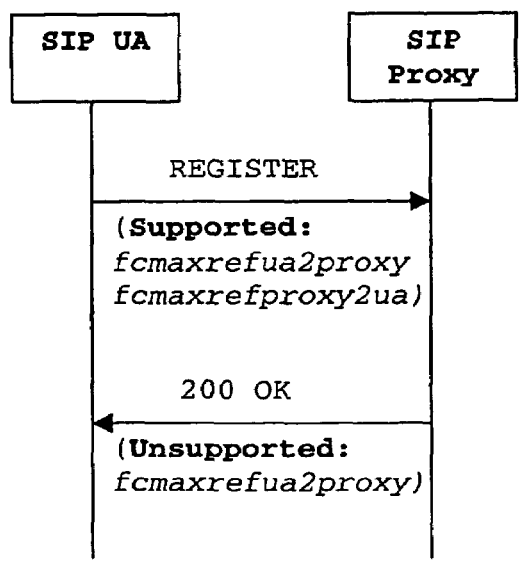
FIG.-4c-
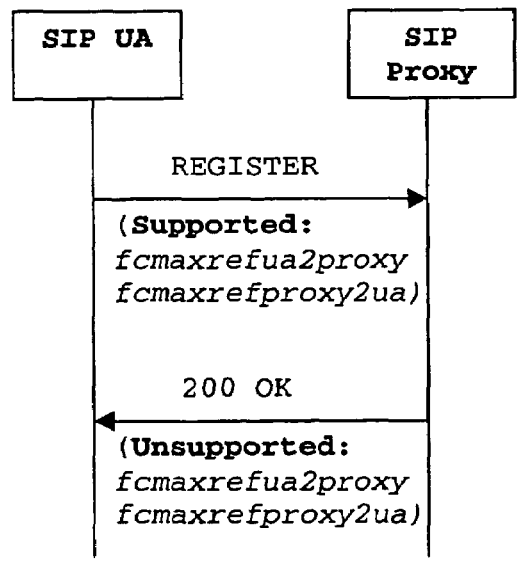
FIG.-4d-

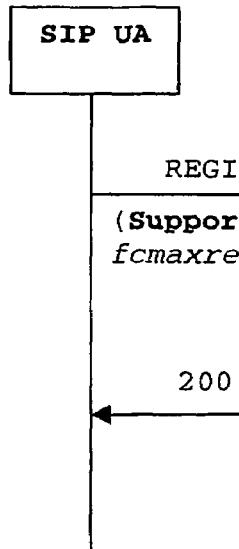
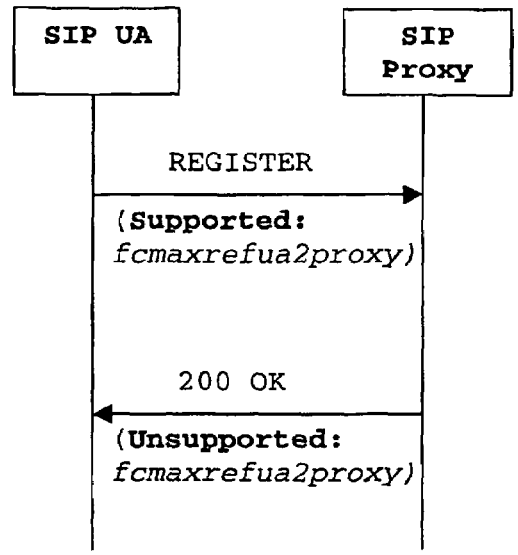
FIG.-5a-   FIG.-5b-
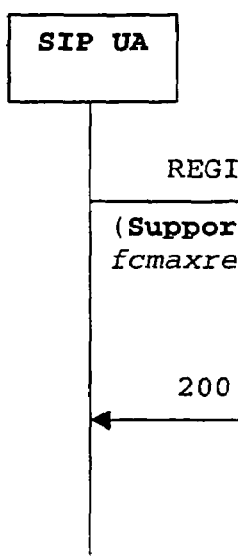
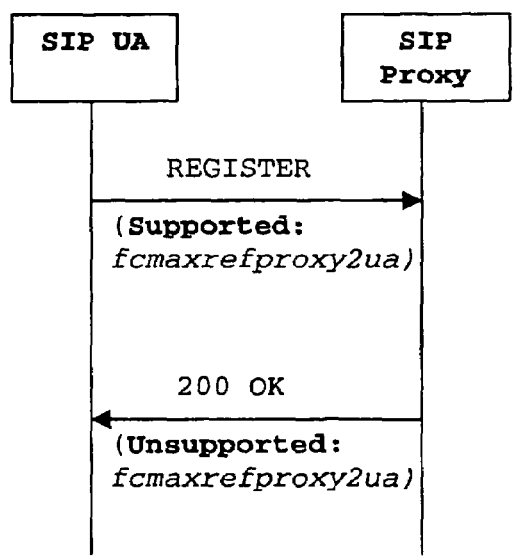
FIG.-5c-   FIG.-5d-

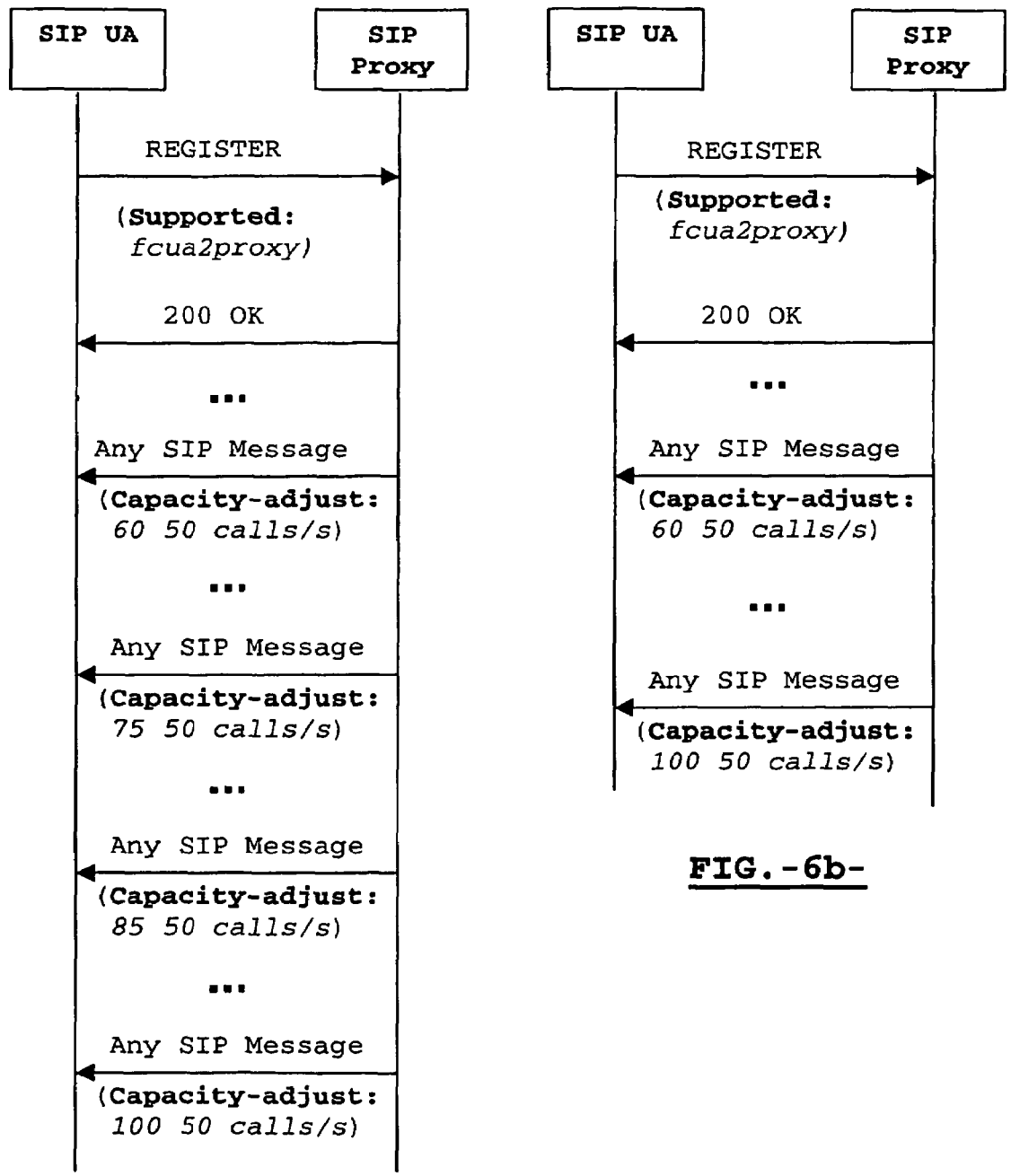
FIG.-6a-
FIG.-6b-

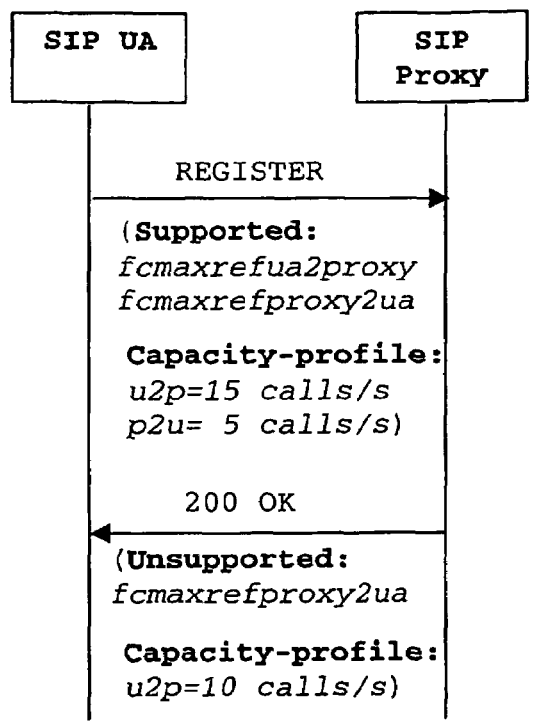
FIG.-7a-
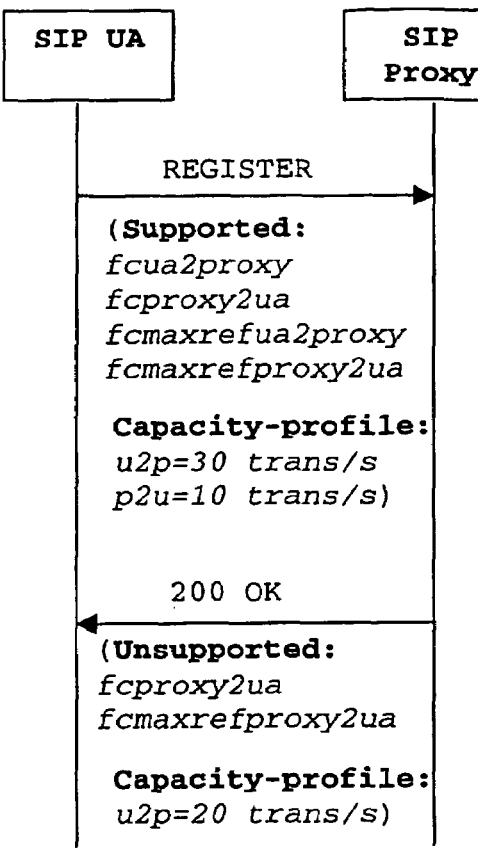
FIG.-7b-
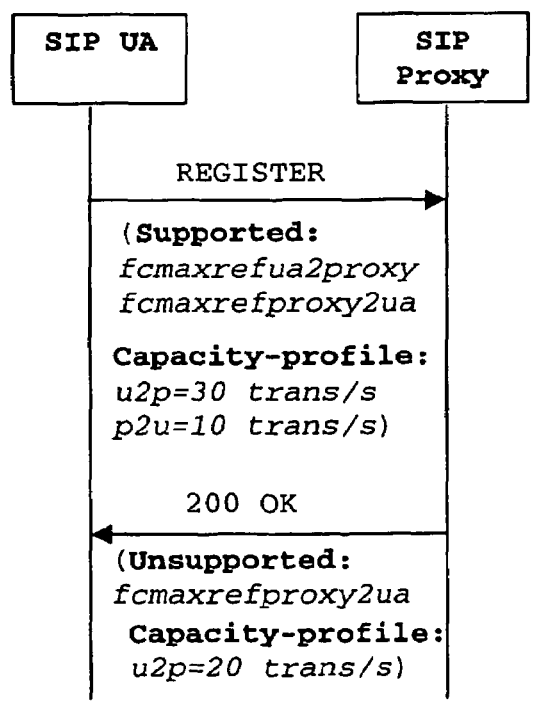
FIG.-7c-

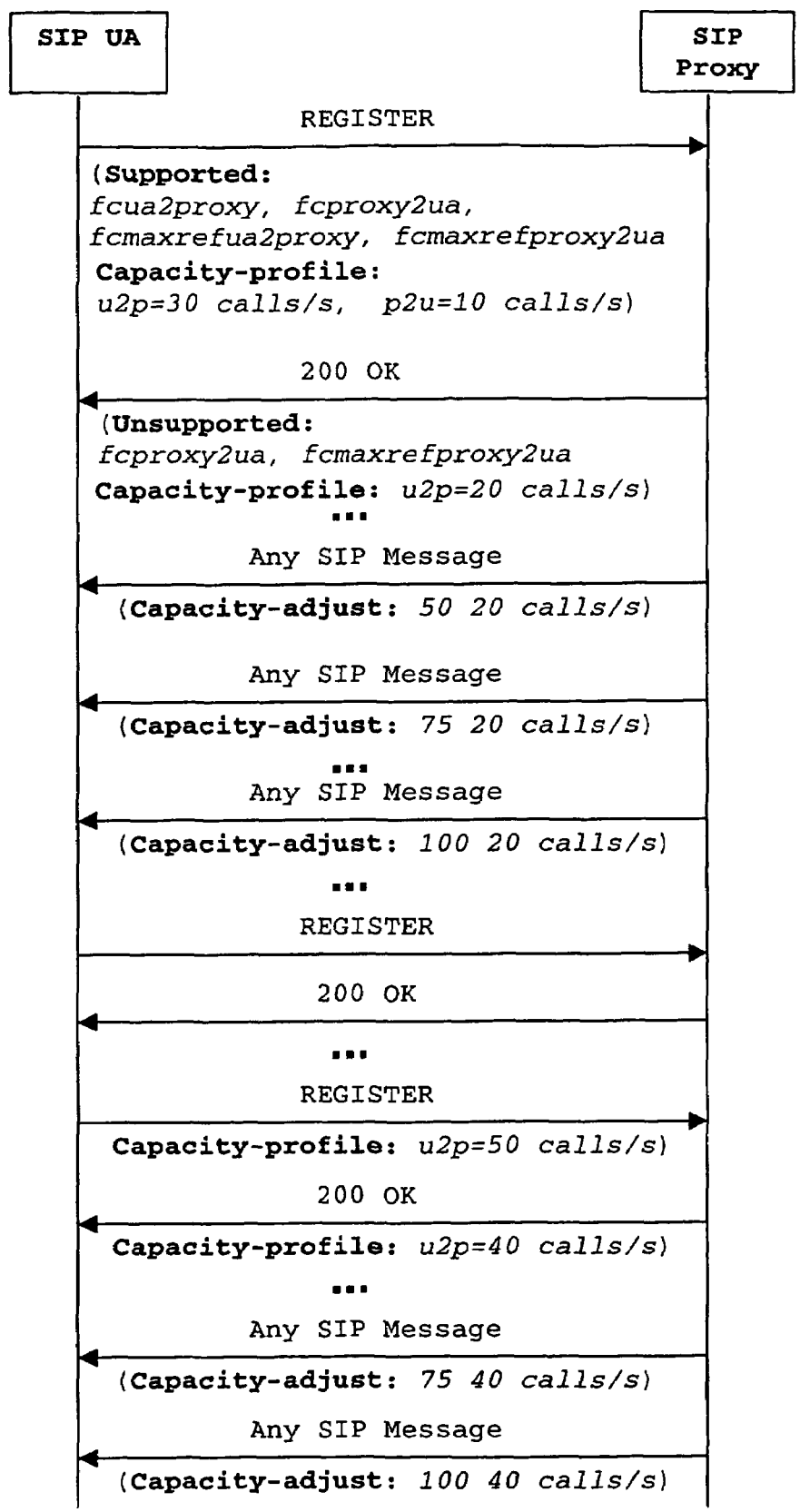
FIG.-8-

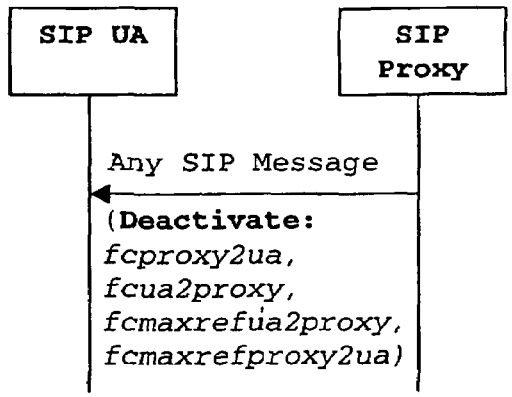
FIG.-9a-
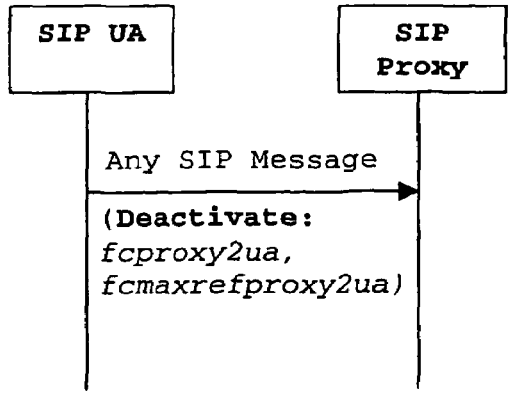
FIG.-9b-
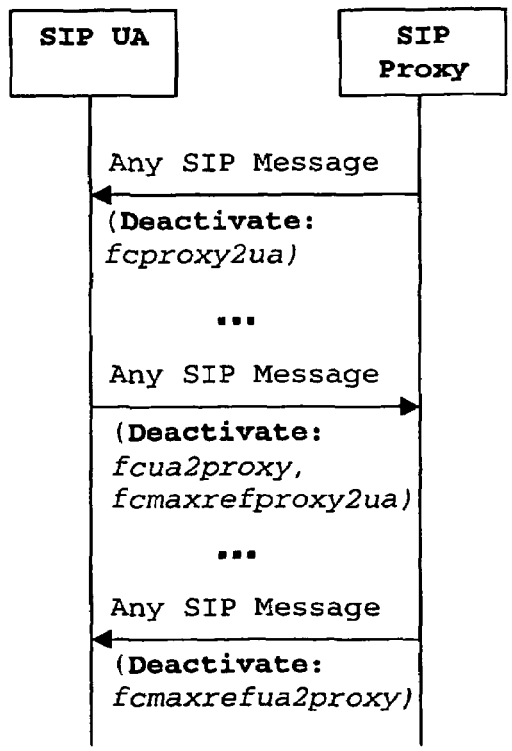
FIG.-9c-
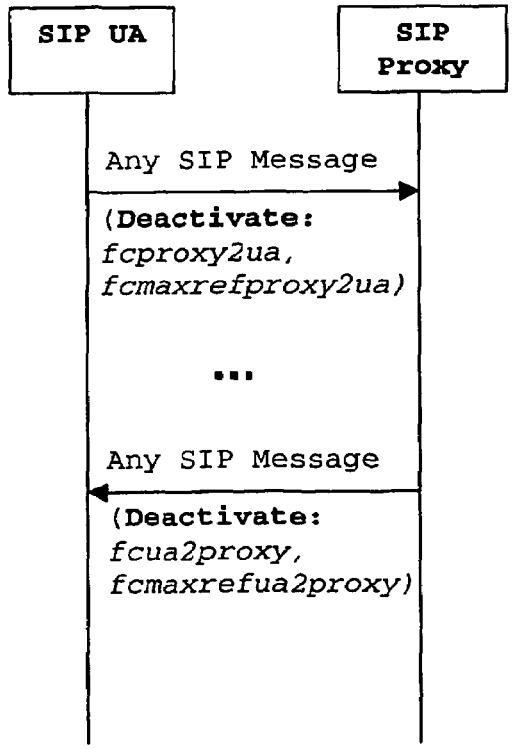
FIG.-9d-

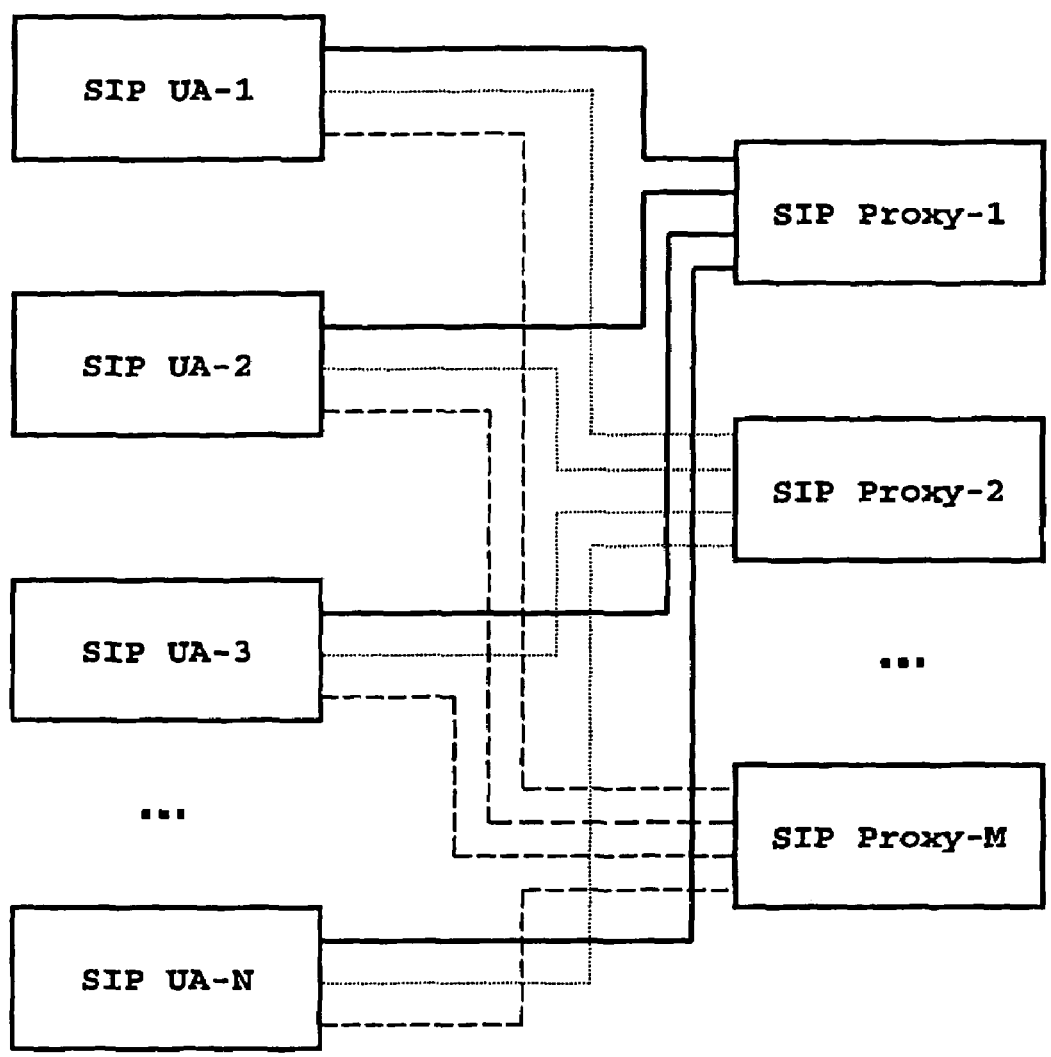
FIG.-10-

METHOD AND SYSTEM FOR CONTROLLING TRAFFIC LOAD BETWEEN MEDIA GATEWAY CONTROLLERS AND PROXIES

The present invention relates generally to traffic load limitations between the Telephony domain and the Internet domain, wherein the border between said Telephony and Internet domains is represented by an inter-working network entity. More specifically, the invention relates to the traffic flow control to be implemented in this inter-working network entity.

BACKGROUND

There is currently a great interest world wide in providing inter-working between Telephony and Internet Protocol (IP) based networks in order to extend their respective services and advantages into the other network. One of the main reasons behind this interest resides on the increased flexibility and reduced operating cost characteristics of IP-based networks as transporting circuit switched network related signalling information between signalling points. Such inter-working between Telephony and IP-based networks is commonly represented by an inter-working node acting as the border between both corresponding domains, the Telephony domain and the IP domain. This inter-working node is in charge of attending all the incoming requests from the IP domain as well as of sending all the traffic coming from the telephony domain to the IP domain.

One of the preferred protocols in the IP domain for call/session control is the Session Initiation Protocol (SIP), which is now under specification by the SIP Working Group of the Internet Engineering Task Forces (SIP IETF WG), within the Transport Area. In fact, several SIP entities, the so called Call Status Control Function (CSCF), have been defined in the third Generation Partnership Project (3GPP) which allow the Circuit Switched and the IP multimedia domains be interconnected.

In this respect, it is noticeable the effort in order to define protocol mapping mechanisms to make this inter-working possible between IP and Circuit Switched networks. For example, the SIPPING Working Group within the Transport Area of the IETF defines the SIP-T framework to facilitate the interconnection of the Public Switched Telephone Network (PSTN) with the IP network. On the other hand, the Integrated Services Digital Network (ISDN) is nowadays a world wide spread network shared by both fixed and mobile networks wherein the ISDN User Part (ISUP) of a Signalling System #7 (SS7) is the signalling protocol that said ISDN makes use of. In this respect, the ISUP to SIP Mapping is another initiative from the SIP IETF WG, describing a way to perform the mapping between said two signalling protocols.

The current architectural proposals for this inter-working node, border between the Telephony and the IP domains, go towards some gateway decomposition approach, as basically resulting from studies carried out by the International Telecommunications Union (ITU), the European Telecommunication Standard Institute (ETSI), the Multi-Switching Service Forum (MSF), and the above referred IETF standardization bodies.

The current inter-working node comprises a Media Gateway (MGW) responsible for establishing call connections over a bearer network, and a Media Gateway Controller (MGC) implementing call control related procedures connected to the Media Gateway. Both nodes communicate to each other by making use of a control protocol, which is described in the ITU-T Recommendation H.248, and is also followed up by the MEGACO Working Group within the Transport Area in the IETF.

From a SIP domain viewpoint, the inter-working node acts as a SIP User Agent (hereinafter SIP-UA) that is connected to at least one of a plurality of SIP proxies located in the IP domain. Said inter-working between SIP-UA and SIP-Proxy is then regarded as the main bottleneck between both Telephony and IP Domains, namely between both Telephony and IP networks where SIP is used. Moreover, this main drawback extends beyond the inter-working between Telephony and IP networks, This main drawback is a rather negative influence on any general scenario comprising SIP-UA and SIP-Proxy connections. In such a scenario, there is still a lack of reliable flow control mechanisms to avoid the inter-working nodes becoming temporarily unavailable, or even being completely down, just because they are not able to handle as much traffic as they might be receiving at a certain time.

RELATED ART

There are multiple instances of the currently accepted separation between call control and bearer control that the aforementioned gateway decomposition in a MGC and a MGW is aimed to. For example and just incorporated by reference, the international patent application WO-01/49045 provides for a method of transporting Call control related signalling between a first network employing SS7 signalling and a second network in which Call control functionality is handled in a MGC and Bearer control in a MGW. The method includes the distribution of call control signalling to the MGC through a MGW, said MGW controlled by the MGC using the MEGACO protocol. This separation of call control signalling and bearer control signalling introduces the rational for a so called Bearer Independent Call Control (BICC) protocol as well as for a so called Transport Independent Call Control (TICC). Further, this international application points out that the Call control signalling could be sent for example over an IP network or over an SS7 network. Furthermore, the SIP protocol is noticed as an alternative transport independent control protocol to TICC. However, this application does not explain how the MGC maps incoming ISUP Call control signalling to SIP related Call control signalling, or how the MGC behaves as a SIP-UA towards the SIP domain, or, even less, how traffic flow control can be carried out between SIP-UA and SIP-Proxy.

On the other hand, the United States Patent Application 20010023453 describes a method and an arrangement in a data packet communication system for providing users the possibility to control the available bandwidth of application data flows in and out of the terminal in accordance with the user's preferences. This invention provides the user with a possibility to speed up applications that are found to be more important by restricting application flows of applications that are found less important. Incoming application data flows are controlled by manipulating window sizes that are reported to the respective senders of the incoming application flows. Outgoing data flows are controlled by supervising the sending times of data packets on the different outgoing application flows. Control decisions are based on information about the user's preferences, which information is stored in a memory in the terminal. The teaching of this patent application is mainly addressed to control individual data flows in accordance with user's preferences. However, there is no direct applicability from the rational behind this application to implement a network traffic flow control between a SIP-UA and a SIP-Proxy, said flow control carried out by cooperating entities to the one suffering unavailability for handling traffic. Moreover, this application is rather focusing on prioritising incoming and outgoing data flows based on user's preferences than on implementing flow control mechanisms between SIP-UA and SIP-Proxy for them to keep on working within safe traffic load margins and serving many users origin and destination of these traffic flows.

The international patent application WO 01/28257 introduces interesting aspects to consider as analysing the known prior art. This application teaches a method of prioritising actions at a gateway to a bearer network, said gateway comprising a MGW responsible for establishing call connections over the bearer network, and a MGC coupled to the MGW. Said MGC determines the priority of signalling messages received, and converts them into so called Media Gateway Control Protocol (MGCP) messages including a parameter to indicate the priority of the associated signalling message. The MGCP message is then transferred to the MGW, which acts upon the message in accordance with the indicated priority. This message priority is useful to speed up the handling and treatment of calls with higher priority, whereas messages with lower priority can wait without suffering unacceptable delays. There is a great advantage on this teaching since the support for message priority is an advantageous aspect as implementing a realistic flow control based on co-operation from adjacent nodes. However, there is no explanation in this international application on how to carry out a sort of flow control mechanism shared by the co-operating entities involved.

That is, focusing on the aforementioned inter-working between conventional Telephony and Internet networks, respectively represented by the Telephony and SIP domains, the Media Gateway Controller is within the interconnecting node the entity that implements the call control procedures in the telephony domain. Additionally, this entity is acting as a SIP User Agent accordingly with the specifications of the IETF Request For Comments (RFC) 2543 "SIP: Session Initiation Protocol". However, there is no known mechanism yet to carry out a traffic flow control at this MGC acting as a SIP-UA towards the SIP domain, said mechanism being appropriately co-ordinated with the existing one towards the Telephony domain.

The inter-domain traffic is typically negotiated at call control level between the MGC acting as a SIP-UA and the SIP-Proxy that it is connected to. These two nodes, the SIP-UA and SIP-Proxy, constantly receive requests from each other asking for new calls to be established, which will be directly controlled by them. In case of high traffic from the opposite node, for example from the SIP-UA to the SIP-Proxy, there may be a lack of processing capacity in the receiving node, namely in the SIP-Proxy.

Currently, both nodes can somehow control this SIP-related traffic flow just using any flow control mechanism that the transport level might provide, depending on the underlying protocol layers and technologies involved. This dependence makes insufficient any flow control mechanism to solve any overload situation between a SIP-UA and a SIP-Proxy based only on facilities offered by the transport layer. For instance, the User Datagram Protocol (UDP) does not include any sort of flow control mechanism. Moreover, in chapter 23.5.4 "503: Service Unavailable" of the aforementioned RFC 2543, some actions are suggested at SIP level that might be taken at a certain reference node in order to inform other adjacent node that said reference node is undergoing some overload situation. That is, current trends address to not just trusting any flow control mechanism that the transport level may provide with but rather to other mechanisms at the SIP level. Nevertheless, the way out outlined in said chapter in RFC 2543 just suggests a black-or-white solution, thus the traffic is re-routed to other server until the unavailable node recovers and goes back to a normal situation.

In this respect, it is a main object of the present invention to provide a solution for allowing a certain SIP node under reference to inform other adjacent SIP nodes about its current availability measurements. Said adjacent SIP nodes may act with this information to carry out flow control mechanisms by grading and controlling their respective traffic load towards the SIP node under reference. These traffic flow control mechanisms, proposed by the present invention, define an inter-working framework for a SIP-UA and a SIP-Proxy to keep on working under high traffic conditions. Specifically, when the SIP-UA resides in a Media Gateway Controller (MGC), said SIP-UA might likely be connected to a single SIP-Proxy being said SIP-Proxy generally known as an Outbound SIP-Proxy. Such a couple SIP-UA and SIP-Proxy can be regarded as the basic scenario to apply traffic flow control mechanisms in accordance with the present invention.

Further, it is another object of the present invention to provide these traffic flow control mechanisms in broader scenarios than the aforementioned couple SIP-UA and SIP-Proxy. Said broader scenarios comprising a plurality of SIP nodes which in particular may be acting as SIP-UA, SIP-Proxy or any combination thereof.

SUMMARY OF THE INVENTION

A first embodiment of the present invention accomplish said objects by providing a method to carry out flow control mechanisms between network nodes that are responsible for signalling multimedia sessions over data networks allowing said nodes keeping on working under high traffic conditions.

In a first aspect, the method allows the implementation of a first flow control mechanism called Capacity Adjustment Indication (CAI) mechanism between, at least, two connected nodes for at least one direction of the traffic flow. The method includes a negotiation between said nodes, initiated at any one of them, to agree on the availability of a CAI mechanism in both nodes for controlling the traffic flow between them in at least one traffic flow direction. A requester node that, for example, suffers a capacity limitation initiates the negotiation. Said requester node indicating to a requested node at least one traffic flow direction for which a CAI mechanism is supported in the requester node. The negotiation ends with the confirmation that said mechanism is also supported in the requested node. Then, the existing CAI mechanism(s) is/are used for accommodating the traffic load between said nodes to the capacity of the traffic receiver node in the direction(s) of the traffic flow for which both nodes support the CAI mechanism(s). For achieving said accommodation, the capacity limitations of the traffic receiver node are determined, then the traffic receiver node sends capacity adjustment indications to the traffic sender node which store said indications and acts upon the traffic flow in accordance with them. The capacity adjustment indications sent from the traffic receiver node to the traffic sender node include information about the maximum incoming traffic load that said traffic receiver node is able to deal with from said traffic sender node and about the units in which traffic is measured.

In a second aspect, the method allows the implementation of a second flow control mechanism called Capacity Reference Exchange (CRE) mechanism between, at least, two connected nodes for, at least one direction of the traffic flow. The method includes a negotiation between said nodes, initiated at any one of them, to agree on the availability of a CRE mechanism in both nodes for controlling the traffic flow between them in at least one traffic flow direction. The negotiation is initiated by a requester node indicating to a requested node at least one traffic flow direction for which a CRE mechanism is supported in the requester node and ends with the confirmation that said mechanism is also supported in the requested node. Then, the existing CRE mechanism(s) is/are used for establishing a maximum reference limit for the traffic flow between said nodes in the direction(s) of the traffic flow for which both nodes support the CRE mechanisms. The implementation of the CRE mechanism includes a first step in which the maximum traffic load supported in both nodes for both traffic directions is determined. Then, a second step in which both nodes exchange information regarding their capacity references. Finally, the nodes agree on a capacity reference supported by both of them.

The CAI mechanism is the "core" flow control mechanism of the present invention. The CRE mechanism adds some "fine" controls to the CAI mechanism, but it is not mandatory for the CAI mechanism to work.

The flow control mechanisms, "core" and "fine", carried out according to the method applies, in broader scenarios, to SIP nodes, acting in particular as SIP-UA or SIP-Proxy. However the basic scenario for the method is a SIP-UA node residing in a Media Gateway Controller (MGC) connected to a single SIP-Proxy node, generally known as an Outbound SIP-Proxy.

A second embodiment of the present invention provides a telecommunications system comprising a first Media Domain wherein multimedia sessions are signalled by a protocol operating according to a Session Initiation Protocol, a second Media Domain wherein multimedia sessions are signalled by a protocol operating according to a second standard. Said telecommunications system also comprises Media Gateways in charge of receiving and sending media between said first and second Media Domains, and Media Gateway Controllers for receiving and sending signalling related to multimedia sessions between said first and second Media Domains. The aforementioned telecommunications system in which two connected nodes carry out a negotiation to agree on whether capacity adjustment indication (CAI) mechanisms exist in both nodes for controlling the traffic flow between them in at least one of both directions, said negotiations being initiated at any one of said nodes. The negotiation and implementation of the existing CAI mechanisms takes place in similar manner as the one described above.

In said telecommunications system, two connected nodes may also carry out a second negotiation to agree on whether capacity reference exchange (CRE) mechanisms exist in both nodes for establishing maximum reference limits for the traffic flow in at least one of both directions and implement the existing CRE mechanisms.

BRIEF DESCRIPTION OF DRAWINGS

The features, objects and advantages of the invention will become apparent by reading this description in conjunction with the accompanying drawings, in which:

FIG. 1 basically illustrates system architectures comprising a typical Telephony domain inter-working with a SIP domain via a coupled Media Gateway and Media Gateway Controller.

FIG. 2a, 2b, 2c and 2d present particular sequence diagrams of possible negotiations for supporting basic flow control mechanisms in at least one of both proposed directions between two entities in a SIP domain.

FIG. 3a, 3b, 3c and 3d present particular sequence diagrams of possible negotiations for supporting basic flow control mechanisms in just one direction proposed between two entities in a SIP domain.

FIG. 4a, 4b, 4c and 4d present particular sequence diagrams of possible negotiations for supporting additional mechanisms for establishing maximum reference traffic limits in at least one of both proposed directions between two entities in a SIP domain.

FIG. 5a, 5b, 5c and 5d present particular sequence diagrams of possible negotiations for supporting additional mechanisms for establishing maximum reference traffic limits in just one direction proposed between two entities in a SIP domain.

FIG. 6a and 6b show instances of negotiation and operation of the basic mechanism for flow control between two entities in a SIP domain, said mechanisms in FIG. 6a and FIG. 6b respectively acting in a "step by step" performance and in a "all of a sudden" performance.

FIG. 7a, 7b and 7c show examples of negotiation and operation of the additional mechanism for establishing maximum reference traffic limits between two entities in a SIP domain. In particular FIG. 7b shows how negotiation of basic and additional mechanisms may be carried out simultaneously.

FIG. 8 illustrates an example of negotiation and operation of both basic mechanism for flow control and additional mechanism for establishing maximum reference traffic limits carried out between two entities in a SIP domain.

FIG. 9a, 9b, 9c and 9d present exemplary sequence diagrams of possible deactivation of basic, or additional, or both mechanisms carried out on a per basic mechanism, or per additional mechanism, or per combinations thereof between two entities in a SIP domain.

FIG. 10 illustrates a generic SIP domain wherein a plurality of first SIP nodes inter-work with a plurality of second SIP nodes, each particular couple of a first and a second node able to negotiate and operate the basic mechanism for flow control and the additional mechanism for establishing maximum reference traffic limits.

DETAILED DESCRIPTION OF PREFERRED EMBODIMENTS

The following describes currently preferred embodiments of methods and apparatus to provide traffic flow control mechanisms between a plurality of SIP nodes which in particular may be acting as SIP-UA, SIP-Proxy or any combination thereof. For explanatory purposes, and for the sake of clarity, the following description usually refers to mechanisms between a SIP-UA and a SIP-Proxy, however, these preferred embodiments are also applicable to the aforementioned plurality of SIP nodes, and thus specifically pointed out when appropriate, likely with additional and particular details.

Generally speaking, some traffic information is exchanged between a SIP-UA and a SIP-Proxy wanting to implement explicit flow control mechanisms between them.

More specifically, these mechanisms include two different procedures involving a new SIP header each, and both procedures controlled through the use of new option-tags in the existing so called 'Supported' SIP header.

A first procedure, the so-called 'Capacity Adjustment Indication', represents primary mechanisms of this flow control, and core of this proposal. These primary mechanisms allow the SIP-UA and the SIP-Proxy to request each other the accommodation of the traffic load to the current capacity situation. For example, one might request the other to first reduce the traffic between them, in order to cope with some traffic handling limitations, and then to increase that traffic rate again when the limiting cause is over. In accordance with a first aspect of preferred embodiments, this first procedure is associated to two new option-tags in the existing 'Supported' SIP header. These new option-tags as well as the format for the corresponding first new SIP header are further described in detail with reference to explanatory use cases and examples.

A second procedure, the so-called 'Capacity References Exchange', represents a secondary mechanism of this flow control that adds some fine controls to the previous ones, though it is not mandatory for the primary mechanisms to work. In accordance with a second aspect of preferred embodiments, this second procedure is associated to another two new option-tags in the existing 'Supported' SIP header. These other two new option-tags as well as the format for the corresponding second new SIP header are also further described in detail with reference to explanatory use cases and examples.

The first procedure, the so-called Capacity Adjustment Indication (hereinafter referred to as CAI), is based on handshake related features. These handshake features allow the SIP nodes to negotiate, and agree on, to what extent they both are able to support such a first procedure. For instance, an object of negotiation between SIP nodes such as a SIP-UA and a SIP-Proxy, namely a handshake feature, is whether a mechanism is available to control the traffic flow coming out from the SIP-UA towards the SIP-Proxy. Another handshake feature within this first procedure is whether a mechanism is available to control the traffic flow coming out from the SIP-Proxy towards the SIP-UA. Indeed, if one SIP node such as a SIP-UA or a SIP-Proxy supports any of these two features, the other adjacent node must also support the same feature in order to effectively carry out the traffic flow control in the appropriate direction.

In accordance with a said first aspect of the currently preferred embodiments, two new flow control related option-tags may be used as handshake features within these primary mechanisms in order to limit the scope of the applicable flow control according to what is supported by both SIP nodes:

(i) a first option-tag, the so-called 'fcua2proxy', meaning that an agreement on this new feature indicates that a mechanism is available to control the traffic flow coming out from the SIP-UA towards the SIP-Proxy; and (ii) a second option-tag, the so-called 'fcproxy2ua', meaning that an agreement on this new feature indicates that a mechanism is available to control the traffic flow coming out from the SIP-Proxy towards the SIP-UA.

For example, when the SIP-UA tells the SIP-Proxy that it supports the new feature 'fcua2proxy', it means that the SIP-UA is ready to accept a capacity adjustment request from the SIP-Proxy to act upon the traffic flow towards said SIP-Proxy. On the other hand, when the SIP-Proxy tells the SIP-UA that it supports such new feature, it means that the SIP-Proxy expects the SIP-UA to accept capacity adjustment requests to act upon the traffic flow towards the SIP-Proxy. Similarly, when the SIP-UA tells the SIP-Proxy that it supports the new feature 'fcproxy2ua', it means that the SIP-UA expects the SIP-Proxy to accept capacity adjustment requests to act upon the traffic flow towards the SIP-UA. On the other hand, when the SIP-Proxy tells the SIP-UA that it supports this new feature, it means that the SIP-Proxy is ready to accept a capacity adjustment request from the SIP-UA to act upon the traffic flow towards the SIP-UA. Nevertheless, if for example the SIP-UA supports 'fcua2proxy' but the SIP-Proxy does not support it, no flow control mechanism will be enabled to control the traffic flow from the SIP-UA towards the SIP-Proxy.

Alternative embodiments may be suggested to negotiate the aforementioned handshake features. Generally speaking, a handshake implies messages on the onward and backward directions. In accordance with a currently preferred embodiment, the handshake can be performed during the SIP Registration mechanism. That is, as the SIP-UA registers at the SIP-Proxy, the existing 'Supported' header is included in the SIP REGISTER message from the SIP-UA showing whether the SIP-UA supports any of these two new features. Then, the SIP-Proxy confirms back, for instance with a '200 OK' successful response, whether its own configuration for flow control supports what has been requested from the SIP-UA. If not, the existing 'Unsupported' header may be used to show which features are not supported.

Another embodiment not substantially different from the previous one may be the adaptation of the OPTIONS method as described in the aforementioned IETF RFC 2543. Said RFC states that the response to a previous OPTIONS method may contain a message body indicating the capabilities of the end-system rather than properties of any existing call, and these new handshake features are actually end-system or node related capabilities. Thus, this alternative embodiment proposes that the SIP node issuing the OPTIONS includes the existing 'Supported' header to show which of these two new handshake features said SIP node is supporting. The adjacent SIP node confirms back in the response to the OPTIONS method whether its own flow control configuration supports what has been requested from the sending node. If not, the existing 'Unsupported' header will be used to show which features are not supported. The OPTIONS alternative would work in a similar manner as the adapted SIP Registration procedure with the additional advantage that the SIP-Proxy would be able to start the feature negotiation in this case too. However and provided that this alternative embodiment is preferred, the normal SIP Registration procedure should have been previously performed.

These or other alternative embodiments, or adaptations thereof, can be used for the same or similar purposes without modifying the substantial scope of the present invention as anyone skilled in the art may appreciate. For the sake of clarity, all the examples, use cases, and additional embodiments for other aspects of the present invention are hereinafter described only with regard to the adapted SIP Registration mechanisms.

In FIG. -2a- the SIP-UA can handle flow control in both directions, that is, the SIP-UA supports both the 'fcua2proxy' and 'fcproxy2ua' new features, which are thus included in the 'Supported' header in the SIP REGISTER message. Since the SIP-Proxy supports both of them as well, the SIP-Proxy answers the successful result '200 OK' with no 'Unsupported' header. From now on, both features are eventually enabled between both nodes, and both nodes may request each other to adjust the traffic between them.

In FIG. -2b- the SIP-UA also supports both new features, 'fcua2proxy' and 'fcproxy2ua', which are thus included in the 'Supported' header in the SIP REGISTER message. However, the SIP-Proxy does not support any flow control for traffic from the SIP-Proxy to the SIP-UA and, consequently, the SIP-Proxy answers the successful result '200 OK' with an 'Unsupported' header including the unsupported feature 'fcproxy2ua'. From now on, just the 'fcua2proxy' is enabled and 'fcproxy2ua' is finally disabled. That is, just the SIP-Proxy may request the SIP-UA to act upon the traffic towards the SIP-Proxy.

In FIG. -2c- the SIP-UA also supports both new features, 'fcua2proxy' and 'fcproxy2ua', which are thus included in the 'Supported' header in the SIP REGISTER message. However, the SIP-Proxy does not support, or rather does not require, any flow control for incoming traffic from the SIP-UA and, consequently, the SIP-Proxy answers the successful result '200 OK' with an 'Unsupported' header including the unsupported feature 'fcua2proxy'. From now on, just the 'fcproxy2ua' is enabled whereas 'fcua2proxy' is eventually disabled. That is, just the SIP-UA may request the SIP-Proxy to act upon the traffic towards said SIP-UA.

In FIG. -2d- the SIP-UA also supports both new features, 'fcua2proxy' and 'fcproxy2ua', which are thus included in the 'Supported' header in the SIP REGISTER message. However, the SIP-Proxy does not require or does not support any flow control for incoming or outgoing traffic from or to the SIP-UA and, consequently, the SIP-Proxy answers the successful response '200 OK' with an 'Unsupported' header including both unsupported features 'fcua2proxy' and 'fcproxy2ua'. That is, both 'fcproxy2ua' and 'fcua2proxy' are eventually disabled, and none of the nodes may request the other to act upon the traffic between them.

The SIP-UA in these four previous use-cases was always able to support flow control mechanisms in both directions. That is, said SIP-UA always supported both new handshake features 'fcua2proxy' and 'fcproxy2ua'. There might be, however, situations in which the initiator of handshake in a preferred embodiment making use of the adapted SIP Registration procedure, namely the SIP-UA, only supports flow control in one direction. In this case, the unsupported handshake feature in the SIP-UA does not even deserve being negotiated.

For instance, in FIG. -3a- the SIP-UA only supports the 'fcproxy2ua' new feature, which is thus included in the 'Supported' header in the SIP REGISTER message. Since the SIP-Proxy also supports this feature, the SIP-Proxy answers the successful result '200 OK' with no 'Unsupported' header. From now on, just the 'fcproxy2ua' is enabled whereas 'fcua2proxy' is eventually disabled. That is, just the SIP-UA may request the SIP-Proxy to act upon the traffic towards said SIP-UA.

In FIG. -3b-, the SIP-UA only supports the 'fcproxy2ua' new feature, which is thus included in the 'Supported' header in the SIP REGISTER message. However, the SIP-Proxy does not support any flow control for traffic from the SIP-Proxy to the SIP-UA and, consequently, the SIP-Proxy answers the successful result '200 OK' with an 'Unsupported' header including the unsupported feature 'fcproxy2ua'. That is, from now on both 'fcproxy2ua' and 'fcua2proxy' are eventually disabled, and none of the nodes may request the other to act upon the traffic between them.

Also for instance, in FIG. -3c- the SIP-UA only supports the 'fcua2proxy' new feature, which is thus included in the 'Supported' header in the SIP REGISTER message. Since the SIP-Proxy also supports this feature, the SIP-Proxy answers the successful result '200 OK' with no 'Unsupported' header. From now on, just the 'fcua2proxy' is enabled whereas 'fcproxy2ua' is eventually disabled. That is, just the SIP-Proxy may request the SIP-UA to act upon the traffic towards said SIP-Proxy.

In FIG. -3d-, the SIP-UA only supports the 'fcua2proxy' new feature, which is thus included in the 'Supported' header in the SIP REGISTER message. However, the SIP-Proxy does not support, or rather does not require, any flow control for incoming traffic from the SIP-UA and, consequently, the SIP-Proxy answers the successful result '200 OK' with an 'Unsupported' header including the unsupported feature 'fcua2proxy'. That is, from now on both 'fcproxy2ua' and 'fcua2proxy' are eventually disabled, and none of the nodes may request the other to act upon the traffic between them.

After this initial handshake has been carried out, and according to what has been agreed on, any SIP node might be able to send capacity adjustment indications to the adjacent node in order to alter the traffic rate between them. To this end, the scenario resulting from an initial handshake carried out in accordance with FIG. -3c- is taken as a reference case following this in order to describe the capacity adjustment procedure. More precisely, the 'fcua2proxy' feature is enabled; that is, flow control from SIP-UA to SIP-Proxy is supported. Similar teaching may be inferred from the reverse direction as anyone skilled in the art may appreciate.

A successful negotiation resulting from the initial handshake scenario in FIG. -3c- means that the SIP-Proxy will keep an eye on the traffic coming from the SIP-UA. If anything happened for the SIP-Proxy to accept less traffic from the SIP-UA, a request would be sent to the SIP-UA to adjust the traffic flow to the new conditions. The SIP-UA, having agreed on this flow control during the initial handshake procedure, will be ready to receive that capacity adjustment request at any time.

Generally speaking, the node towards which the traffic is being flow-controlled, namely the requesting node, is given the logic to detect capacity limit situations, maintenance activities for example, or is able to detect that the node has just reached its maximum capacity limit. If this happens, the requesting node, the SIP-Proxy in this example, initiates a Capacity Adjustment Initiation request towards the adjacent co-operating node, the SIP-UA in this example, requiring less traffic to be accepted from said adjacent node as a possible action to compensate the lack of capacity. The SIP-UA, at reception of a Capacity Adjustment Initiation request from the SIP-Proxy, understands that if the traffic rate towards the SIP-Proxy is not reduced, some traffic requests would probably be rejected at the SIP-Proxy without even being analysed.

Said Capacity Adjustment Initiation request may be implemented by functional equivalent means as easily appreciated. In accordance with currently preferred embodiments, a new SIP header is proposed in order to implement this capacity adjustment mechanism, focussing on providing a mechanism to alternatively decrease or increase the traffic rate between both nodes appropriately to the current capacity limits. To this end, said new SIP header may comprise a percentage representing the maximum incoming traffic load that the requesting node is able to deal with from the adjacent node. The new SIP header may also comprise other indications such as the units in which traffic is measured. An exemplary format for said SIP header follows this:

Capacity-adjust: "Capacity adjust" ":"
   traffic-percentage traffic-ref
traffic-percentage: 1*3DIGIT
   ; Range from '000' to '100'.
   ; Percentage of acceptable
   ; 'current-traffic'.
traffic-ref: 1*DIGIT traffic-units
   ; Traffic figure which the
   'traffic-percentage' is
    ; referred to.
traffic-units: "mess/s" | "trans/s" | "call/s"
   ; mess/s (messages per second),
   ; where 'messages' are all SIP
   ; methods (i.e. INVITE, ACK,
   ; OPTIONS, BYE, CANCEL, REGISTER
   ; and INFO) and all provisional ; and final responses;
; trans/s (transactions per
   ; second), including both SIP and
   ; regular transactions;
; call/s (calls per second),
; referred to the whole period
; since the initial INVITE till
; the completion of the call.
DIGIT: ; as described in 'SDP: Session
   ; Description Protocol'.

The requesting node, the SIP-Proxy in this example, is able to measure the traffic handled from the adjacent node, the SIP-UA in this example, at the time the overload situation arises. Those traffic figures are used as a reference, namely the 'traffic-ref' in 'Capacity-adjust' above, for the required percentage to be indicated in the field 'traffic-percentage' included in 'Capacity-adjust'. This 'Capacity-adjust' new header may be sent from the SIP-UA to the SIP-Proxy, and vice versa, in all methods (i.e. INVITE, ACK, OPTIONS, BYE, CANCEL, REGISTER, INFO) and in all provisional and final responses. No response is required from the opposite node.

Still a further and more precise use-case may be presented with reference to the scenario resulting from the handshake procedure shown in FIG. -6a- and FIG. -6b-. After this initial handshake, the SIP-UA starts sending traffic towards the SIP-Proxy with no more initial limitation than its own internal limits to generate traffic. The same considerations are applicable for the SIP-Proxy. At a certain time, the SIP-Proxy detects a faulty situation. Because of that fault, the SIP-Proxy decides that part of the traffic being received from the SIP-UA can not be accepted for a while, thus being rejected. The SIP-Proxy analyses how much traffic is being handled from the SIP-UA at that very same time, in this example '50 calls/s', and decides how much traffic from the SIP-UA can be allowed from that time on. For example, the acceptable traffic might be 60% of '50 calls/s'. Then, the SIP-Proxy informs the SIP-UA about it by including the new SIP header 'Capacity-adjust' in the first message towards the SIP-UA. Provided that the SIP-Proxy did not inform the SIP-UA about its traffic handling limitations, for instance if this solution was not implemented, any traffic over the new capacity limit would be rejected at the SIP-Proxy. The flow control mechanisms in accordance with the invention allow the SIP-UA to know that the traffic limit towards the SIP-Proxy is in this exemplary use-case a 60% of '50 calls/s', in order to guarantee that such traffic is going to be attended as usual. Basically, if the SIP-UA were able to evaluate its traffic rate towards the SIP-Proxy at the moment of the fault in the SIP-Proxy, the resulting figure should be equal to '50 calls/s', or approximately the same. Nevertheless, in order to not forcing the SIP-UA to calculate that value, and even assuming that there might be some deviation between both figures, the SIP-Proxy indicates the reference value which the limit percentage is referred to into the 'Capacity-adjust' parameter. This is the reason for having 'traffic-ref' in the new 'Capacity-adjust' header.

As soon as the SIP-Proxy recovers from the abnormal situation, it might be interested in informing the SIP-UA about it, thus including the same new SIP header, namely the 'Capacity-adjust' parameter, in any of the next messages. The current traffic load from the SIP-UA towards the SIP-Proxy can be increased step by step, or all of a sudden, but always using the same reference value in the 'traffic-ref' argument. This reference value is the traffic load from the SIP-UA as measured by the SIP-Proxy at the time the faulty situation was detected, that is '50 calls/s' in the current example.

In a first exemplary embodiment following this and illustrated in FIG. -6a-, the SIP-Proxy indicates to the SIP-UA an increase of traffic load on a step by step performance. For example, the following three steps are considered:
Capacity-adjust: 75 50 calls/s
   ; Step 1:
   ; First traffic increase indication
   ; towards the SIP-UA.
   ; The SIP-Proxy is recovering from the
   ; fault.
Capacity-adjust: 85 50 calls/s
   ; Step 2:
   ; The SIP proxy keeps on recovering from
   ; the fault.
Capacity-adjust: 100 50 calls/s
   ; Step 3:
   ; Last traffic increase message from the
   ; SIP-Proxy towards the SIP-UA.
   ; The SIP-Proxy is fully available
   ; without limitation.
   ; Back to normal traffic processing
   ; figures.

In a second exemplary embodiment following this and illustrated in FIG. -6b-, the SIP-Proxy indicates to the SIP-UA an increase of traffic load on an all of a sudden performance.
Capacity-adjust: 100 50 calls/s
   ; Just one traffic increase message from
   ; the SIP-Proxy towards the SIP-UA.
   ; The SIP-Proxy is fully available
   ; without limitation.
   ; Back to normal traffic processing
   ; figures.

As may be easily appreciated, the '100 50 calls/s' value does not mean that such figure is the maximum traffic that the SIP-Proxy accepts from the SIP-UA from now on, but rather the end of the traffic limitation towards the SIP-Proxy.

Further, this first procedure for traffic flow control may be refined with a second procedure, the so-called Capacity References Exchange in accordance with a said second aspect of the present invention, by adding the possibility for both SIP nodes to explicitly exchange capacity reference limits. Said capacity reference limits may be regarded as a sort of traffic limits to be further used as permanent references in subsequent Capacity Adjustment Indications. These limits are typically estimations, which might result from some local dimensioning calculations or from user or time profiles, and they are communicated to the adjacent or peer node in order to establish some maximum input or output traffic margins that each node is able to handle under normal conditions.

Said second procedure above referred, the so-called Capacity References Exchange (hereinafter referred to as CRE), is also based on handshake related additional features. These handshake additional features allow the SIP nodes to negotiate, and agree on, to what extent they both are able to support such a second procedure. For instance, another object of negotiation between SIP nodes such as a SIP-UA and a SIP-Proxy, namely a handshake feature, is whether a mechanism is available to establish a maximum reference limit for the traffic flow coming out from the SIP-UA towards the SIP-Proxy. Another handshake feature within this second procedure is whether a mechanism is available to establish a maximum reference limit for the traffic flow coming out from the SIP-Proxy towards the SIP-UA. Indeed, if one SIP node such as a SIP-UA or a SIP-Proxy supports any of these two features, the other adjacent node must also support the same feature in order to effectively define limits for the traffic flow in the appropriate direction.

In accordance with said second aspect of the currently preferred embodiments, two new flow control related option-tags may be used as handshake features within these secondary mechanisms in order to define whether some capacity references may be exchanged between both nodes:

(i) the so-called 'fcmaxrefua2proxy', a first option-tag meaning that an agreement on this new feature indicates that a mechanism is available for both nodes to establish a maximum reference limit for the traffic from the SIP-UA towards the SIP-Proxy; and
(ii) the so-called 'fcmaxrefproxy2ua', a second option-tag meaning that an agreement on this new feature indicates that a mechanism is available for both nodes to establish a maximum reference limit for the traffic from the SIP-Proxy towards the SIP-UA.

For example, when any of the nodes tells the other that it supports the new feature 'fcmaxrefua2proxy', it means that it is able to start or accept a negotiation on the maximum traffic to be handled from the SIP-UA towards the SIP-Proxy. Likewise, when any of the nodes tells the other that it supports the new feature 'fcmaxrefproxy2ua', it means that it is able to start or accept a negotiation on the maximum traffic to be handled from the SIP-Proxy towards the SIP-UA.

In a similar manner as for the CAI procedure, the CRE procedure requires both SIP nodes handshake to what extent they support this second procedure, that is messages on the onward and backward directions. And also as for the CAI procedure, several alternative embodiments and combinations thereof may be suggested for the SIP nodes to indicate each other the aforementioned handshake additional features. In this respect, both the said SIP Registration mechanism and the said OPTIONS method described for the CAI procedure, conveniently adapted in accordance with these embodiments or combinations thereof, are also appropriate for this Capacity References Exchange (CRE) procedure. Also for this CRE procedure and for the sake of clarity, all the examples, use cases, and additional embodiments of the present invention are hereinafter described only with regard to the adapted SIP Registration mechanisms.

In FIG. -4a- the SIP-UA can handle traffic references in both directions, that is, the SIP-UA supports both the 'fcmaxrefua2proxy' and 'fcmaxrefproxy2ua' new features, which are thus included in the 'Supported' header in the SIP REGISTER message. Since the SIP-Proxy supports both of them as well, the SIP-Proxy answers the successful result '200 OK' with no 'Unsupported' header. From now on, both features are eventually enabled between both nodes, and both nodes are able to negotiate maximum values for traffic in both directions.

In FIG. -4b- the SIP-UA also supports both new features, 'fcmaxrefua2proxy' and 'fcmaxrefproxy2ua', which are thus included in the 'Supported' header in the SIP REGISTER message. However, the SIP-Proxy does not support any traffic reference negotiation for traffic from the SIP-Proxy to the SIP-UA and, consequently, the SIP-Proxy answers the successful result '200 OK' with an 'Unsupported' header including the unsupported feature 'fcmaxrefproxy2ua'. From now on just the 'fcmaxrefua2proxy' is enabled and 'fcmaxrefproxy2ua' is finally disabled. That is, just traffic references may be negotiated for the traffic generated from the SIP-UA towards the SIP-Proxy.

In FIG. -4c- the SIP-UA also supports both new features, 'fcmaxrefua2proxy' and 'fcmaxrefproxy2ua', which are thus included in the 'Supported' header in the SIP REGISTER message. However, the SIP-Proxy does not support any traffic reference negotiation for traffic from the SIP-UA to the SIP-Proxy and, consequently, the SIP-Proxy answers the successful result '200 OK' with an 'Unsupported' header including the unsupported feature 'fcmaxrefua2 proxy'. From now on the 'fcmaxrefproxy2ua' is enabled whereas 'fcmaxrefua2proxy' is eventually disabled. That is, just traffic references may be negotiated for the traffic generated from the SIP-Proxy towards the SIP-UA.

In FIG. -4d- the SIP-UA also supports both new features, 'fcmaxrefua2proxy' and 'fcmaxrefproxy2ua', which are thus included in the 'Supported' header in the SIP REGISTER message. However, the SIP-Proxy does not support any traffic reference negotiation for traffic from or to the SIP-UA and, consequently, the SIP-Proxy answers the successful response '200 OK' with an 'Unsupported' header including both unsupported features 'fcmaxrefua2proxy' and 'fcmaxrefproxy2ua'. That is, both 'fcmaxrefproxy2ua' and 'fcmaxrefua2proxy' are eventually disabled, and none of the nodes may be able to negotiate a traffic reference for the traffic between them in any direction.

The SIP-UA in these four previous use-cases was always able to support traffic reference negotiation in both directions. As for the CAI procedure, there might be situations in which the initiator of handshake only supports traffic reference negotiation in one direction as the exemplary four use-cases following this.

For instance, in FIG. -5a- the SIP-UA only supports the 'fcmaxrefua2proxy' new feature, which is thus included in the 'Supported' header in the SIP REGISTER message. Since the SIP-Proxy also supports this feature, the SIP-Proxy answers the successful result '200 OK' with no 'Unsupported' header. From now on, the 'fcmaxrefua2proxy' is enabled whereas 'fcmaxrefproxy2ua' is eventually disabled. That is, just traffic references may be negotiated for the traffic generated from the SIP-UA towards the SIP-Proxy.

In FIG. -5b-, the SIP-UA only supports the 'fcmaxrefua2proxy' new feature, which is thus included in the 'Supported' header in the SIP REGISTER message. However, the SIP-Proxy does not support any traffic reference negotiation for traffic from the SIP-UA and, consequently, the SIP-Proxy answers the successful result '200 OK' with an 'Unsupported' header including the unsupported feature 'fcmaxrefua2proxy'. That is, from now on both 'fcmaxrefproxy2ua' and 'fcmaxrefua2proxy' are eventually disabled, and none of the nodes is able to negotiate traffic references for the traffic between them in any direction.

Also for instance, in FIG. -5c- the SIP-UA only supports the 'fcmaxrefproxy2ua' new feature, which is thus included in the 'Supported', header in the SIP REGISTER message. Since the SIP-Proxy also supports this feature, the SIP-Proxy answers the successful result '200 OK' with no 'Unsupported' header. From now on, just the 'fcmaxrefproxy2ua' is enabled whereas 'fcmaxrefua2proxy' is eventually disabled. That is, just traffic references may be negotiated for the traffic generated from the SIP-Proxy towards the SIP-UA.

In FIG. -5d-, the SIP-UA only supports the 'fcmaxrefproxy2ua' new feature, which is thus included in the 'Supported' header in the SIP REGISTER message. However, the SIP-Proxy does not support any traffic reference negotiation for traffic from the SIP-Proxy to the SIP-UA and, consequently, the SIP-Proxy answers the successful result '200 OK' with an 'Unsupported' header including the unsupported feature 'fcmaxrefproxy2ua'. From now on, both 'fcmaxrefproxy2ua' and 'fcmaxrefua2proxy' are eventually disabled, and none of the nodes is able to negotiate traffic references for the traffic between them in any direction.

Once having completed the initial handshake for the new features 'fcmaxrefproxy2ua' and 'fcmaxrefua2proxy', both SIP nodes may start talking to each other in order to establish some limits for traffic going back and forth between them. In accordance with currently preferred embodiments, another new SIP header is proposed for exchanging these traffic limits, namely capacity references. An exemplary format for said SIP header follows this:

Capacity-profile: "Capacity profile" ":" 1*2 maximum-load
maximum-load: "max-ua2proxy-load" | "max-proxy2ua-load"
max-ua2proxy-load: "u2p" "=" traffic-load
  ; Maximum traffic foreseen from the
  ; sender for the 'ua-to-proxy' traffic.
max-proxy2ua-load: "p2u" "=" traffic-load
  ; Maximum traffic foreseen from the
  ; sender for the 'proxy-to-ua' traffic.
traffic-load: 1*DIGIT traffic-units
traffic-units: "mess/s" | "trans/s" | "call/s"
  ; mess/s (messages per second),
  ; where 'messages' are all SIP
  ; methods (i.e. INVITE, ACK,
  ; OPTIONS, BYE, CANCEL, REGISTER
  ; and INFO) and all provisional
  ; and final responses;
  ; trans/s (transactions per
     ; second), including both SIP and
     ; regular transactions;
  ; call/s (calls per second),
  ; referred to the whole period
  ; since the initial INVITE till
  ; the completion of the call.
DIGIT: ; as described in 'SDP: Session
  Description Protocol'.

In this exemplary format for the new SIP header, the 'u2p' parameter represents the maximum traffic load that the sending SIP entity, for example the SIP-UA or the SIP-Proxy, wants to process in the 'ua-to-proxy' direction. In this respect, the 'u2p' parameter validity is closely associated to the 'fcmaxrefua2proxy' feature. If both nodes have not successfully agreed such feature on, then the value indicated in 'u2p' is useless, since at least one of the nodes is not able to use it at all as a valid reference.

Also in this exemplary format for the new SIP header, the 'p2u' parameter represents the maximum traffic load that the sending SIP entity, for example the SIP UA or the SIP proxy, wants to process in the 'proxy-to-ua' direction. Likewise 'u2p', the 'p2u' parameter validity is closely associated to the 'fcmaxrefproxy2ua' feature. If both nodes have not successfully agreed this feature on, then the value indicated in 'p2u' is useless, since at least one of the nodes is not able to use it at all as a valid reference.

These parameters 'u2p' and 'p2u' define the traffic margin in the respective direction for both nodes to work in the range agreed on. When a SIP node like for example a SIP-UA or a SIP-Proxy receives this new SIP header, this receiver node has to respond back with its own 'Capacity-profile' to eventually agree on a traffic range valid for both nodes. That is, the 'Capacity-profile' header always requires a response from the other end confirming or proposing a new traffic range. The response would be typically based on its own configuration data and it should fit into the 'Capacity-profile' values received from the other node. None of them can just send some 'u2p' and 'p2u' values to the opposite node within the 'Capacity-profile' new header and expect that those values suit the other node capacity requirements.

This reactive behaviour for the 'Capacity-profile' new header leads to several alternatives non-exclusive each other to carry out this Capacity Reference Exchange (CRE) mechanism. As already commented above, similar rational as for the Capacity Adjustment Indication procedure can be applied to this CRE though with less restrictions. In principle, the SIP Registration or more precisely the REGISTER method is appropriate for sending this new header though bearing in mind that in case the SIP-Proxy needs to modify the current traffic range, it will not be able to initiate that exchange on its own. It will need the SIP-UA to first send a REGISTER including a 'Capacity-profile' header so that the lately agreed traffic range could be modified in the '200 OK' response to such REGISTER message. This issue may be easily fixed if the SIP-UA is forced to always include its current 'Capacity-profile' values in all REGISTER messages.

Further, a more flexible embodiment is achieved if, apart from considering the REGISTER, the OPTIONS method is also used at any time to initiate the 'Capacity-profile' exchange from any SIP node like for example, the SIP-UA or the SIP-Proxy. The exchange will be completed at reception of the response to the OPTIONS method. In this case, both nodes would be able to initiate the Capacity Reference Exchange procedure at any time, without limitations derived from the registration period. Furthermore, there is no apparent limitation to assume that all the SIP methods like INVITE, ACK, OPTIONS, BYE, CANCEL, REGISTER and INFO may be carrying such new SIP header to successfully accomplish the Capacity Reference Exchange procedure.

Generally speaking and as shown in FIG. -7a-, a SIP-UA registers at a SIP-Proxy, and decides to use such registration process to handshake both 'fcmaxrefua2proxy' and 'fcmaxrefproxy2ua' new features. Since the SIP-UA supports both features, it is able to start negotiating both 'u2p' and 'p2u' parameters in the 'Capacity-profile' header to establish traffic margins for traffic to or from the SIP-Proxy. The SIP-Proxy confirms the support for 'fcmaxrefua2proxy'. In fact, the SIP-Proxy sends back a final agreement on 'u2p' by reducing to '10 call/s' the '15 call/s' proposed by the SIP-UA. Besides, the SIP-Proxy indicates that 'fcmaxrefproxy2ua' is not supported and, consequently, no agreement on 'p2u' may be accepted. Any further 'Capacity-profile' indication will just include the 'u2p' parameter, and no 'p2u' at all. If any node were interested in using 'p2u' it should negotiate again the support for 'fcmaxrefproxy2ua' by carrying out a new handshake.

Once both primary and secondary mechanisms have been respectively introduced for both Capacity Adjustment Indication (CAI) procedure and Capacity Reference Exchange (CRE) procedure, some of the aforementioned embodiments of isolated handshakes may be merged into new embodiments wherein handshake features from both procedures are simultaneously negotiated. For example in FIG. -7b- all handshake features are proposed by the SIP-UA in one step. As a result of the handshake the flow control will only be carried out from the SIP-UA towards the SIP-Proxy, the SIP-Proxy will be able to send 'Capacity-adjust' indications to the SIP-UA to modify the traffic flow towards said SIP-Proxy, and the SIP-UA will accept those indications from said SIP-Proxy. Moreover, both nodes agree on a maximum rate for the traffic from the SIP-UA towards the SIP-Proxy, which is set to 'u2p=20 transactions per second', the lower value as proposed from the SIP-Proxy. That value may be used as a reference in further 'Capacity-adjust' indications sent from the SIP-Proxy to the SIP-UA in terms of 'traffic-ref=20 tran/s' accordingly with a preferred embodiment above. On the other hand, the SIP-UA will not be able to send 'Capacity-adjust' indications to the SIP-Proxy since said SIP-Proxy does not support 'fcproxy2ua'. Given that the SIP-Proxy does not support 'fcmaxrefproxy2ua', such SIP-Proxy is not interested in defining a maximum value for the traffic from said SIP-Proxy towards the SIP-UA and, consequently, the 'p2u' parameter in 'Capacity-profile' is not used at all.

As supporting both CAI and CRE procedures in a SIP node like a SIP-UA or a SIP-Proxy, the flow control mechanisms rely on the proposed new headers 'Capacity-adjust' and 'Capacity-profile'. Said new headers may be differently used depending on whether there is a short-term or a long-term capacity variation to act upon.

For instance, if there is a temporary situation in the affected node leading to a capacity decrease that will probably be restored in short, the 'Capacity-adjust' header would be more suitably selected, thus being a percentage referred to the last received 'Capacity-profile'. When the problem is over, a new 'Capacity-adjust' may be sent to increase the capacity again by referring to the same reference value in the last received 'Capacity-profile'. However, if there seems to be a new, long-term capacity context in the affected node, the 'Capacity-profile' header would be more appropriate. This header would clearly state that the capacity reference to be used onwards in the opposite node should change.

An example on how these two new headers may be used to implement flow control mechanisms between a SIP-UA and a SIP-Proxy is shown in FIG. -8-. In this example, the registration period has been used to negotiate all handshake features as well as to exchange the 'capacity profiles'. In particular, this initial handshake is the same as the one presented in FIG. -7b- already commented. After this initial handshake, the SIP-Proxy requests the SIP-UA to reduce its traffic towards the SIP-Proxy down to a 50% of the 'u2p' reference previously agreed, which is '20 call/s'. Later, the SIP-Proxy gets over the limiting situation and informs the SIP-UA that the traffic can be increased again. To this end, an exemplary two-step approach has been used. In the first step, the SIP-Proxy tells the SIP-UA to increase the traffic up to 75% of the current 'u2p' reference. In the second step, the SIP-UA is told that the SIP-Proxy is back to its normal behaviour, namely 100% of the current 'u2p' reference. At this point, it has to be noticed that any SIP message might have been used to carry the 'Capacity-adjust' header in accordance with a preferred embodiment above. Further, for instance after a couple of registration periods, both nodes agree on a new traffic reference for the traffic from the SIP-UA towards the SIP-Proxy, which is eventually agreed on a 'u2p=40 call/s'. Then, once again, the SIP-Proxy requests a new decrease of traffic rate from the SIP-UA down to 75% of the current 'u2p' reference. Eventually, the SIP-Proxy recovers from the limiting situation and uses a single-step approach to inform the SIP-UA about it by saying that 100% of '40 call/s' is available.

The previous example is an appropriate instance of a common initial handshake wherein all the features are negotiated in a single step. However, there is no apparent restriction to handshake firstly features related to CAI procedure and secondly features related to CRE procedures, or vice versa. Nevertheless, the CAI procedure and related features represent the essential mechanisms to implement a real flow control, thus, handshaking only features related to CRE procedure will not really implement flow control mechanisms until having negotiated and agreed on CAI procedure related features.

For instance, features related to the CAI procedure are negotiated first in a situation like the one presented in FIG. -2b-. As a result of the initial handshake shown in FIG. -2b-, the SIP proxy is able to send 'Capacity-adjust' indications to the SIP-UA in order to modify the traffic flow towards the SIP-Proxy and, since 'fcua2proxy' is supported, the SIP-UA accepts the corresponding indications from the SIP-Proxy. However, the SIP-UA is not able to send 'Capacity-adjust' indications to the SIP-Proxy since said SIP-Proxy does not support 'fcproxy2ua'. On the other hand, no explicit capacity references are exchanged between both nodes because no feature related to CRE procedure has been negotiated yet. Thus, the 'traffic-ref' argument in any further 'Capacity-adjust' indication from the SIP-Proxy to the SIP-UA will not include any explicit capacity reference previously exchanged between both nodes. Instead, said 'traffic-ref' argument may include the current 'ua-to-proxy' traffic figures measured by the SIP-Proxy as deciding a variation of the traffic rate from the SIP-UA. Next, the other features related to CRE, 'fcmaxrefua2proxy' and 'fcmaxrefproxy2ua' may be separately negotiated as presented in FIG. -7c-. Since 'fcmaxrefua2proxy' is supported, FIG. -7c- shows that both nodes agree on a maximum rate for the traffic from the SIP-UA towards the SIP-Proxy, which is finally set to 'u2p=20 transactions per second'. This figure will be used as a reference in further 'Capacity-adjust' indications sent from the SIP-Proxy to the SIP-UA, that is 'traffic-ref=20 tran/s'. Besides, given that the SIP-Proxy does not support 'fcmaxrefproxy2ua', said SIP-Proxy is not interested in defining a maximum rate for the traffic from the SIP-Proxy towards the SIP-UA. After this second handshake, the behaviour of both nodes will be the same as if all four features had been negotiated at the same time, as above explained with reference to FIG. -7b-.

Another instance of alternating the primary and secondary mechanisms is the negotiation of features related to the CRE procedure first, and then the negotiation of features related to the CAI procedure. For example, as a result of the initial handshake shown in FIG. -7c-, both nodes agree on a maximum rate for the traffic from the SIP-UA towards the SIP-proxy which is eventually set to 'u2p=20 transactions per second', the lower value as proposed from the SIP-Proxy. There will be no further 'Capacity-adjust' indications, until having negotiated the CAI related features, 'fcua2proxy' and 'fcproxy2ua'. This means that the SIP-UA can only avoid going over this capacity reference value in order to preclude request rejections from the SIP-Proxy. In other words, no complete flow control mechanism exists yet. On the other hand, and given that the SIP-Proxy does not support 'fcmaxrefproxy2ua', the SIP-Proxy is not interested in defining a maximum value for the traffic from said SIP-Proxy towards the SIP-UA. Next, the other features related to CAI procedure, 'fcua2proxy' and 'fcproxy2ua' may be separately negotiated as presented in FIG. -2b-. Given that 'fcua2proxy' is supported, the SIP-Proxy is able to send 'Capacity-adjust' indications to the SIP-UA in order to modify the traffic rate towards the SIP-Proxy, and the SIP-UA accepts those indications from the SIP-Proxy. In this respect, the 'traffic-ref' argument in any further 'Capacity-adjust' indication sent from the SIP-Proxy to the SIP-UA is set to the 'u2p' argument exchanged in the previous initial handshake for CRE related features, namely 'traffic-ref=20 tran/s'. On the other hand, the SIP-UA will not be able to send 'Capacity-adjust' indications to the SIP-Proxy since said SIP-Proxy does not support 'fcproxy2ua'. After this second handshake, and as for the previous instance of ordering procedures, the behaviour of both nodes will be the same as if all four features had been negotiated at the same time, as above explained with reference to FIG. -7b-.

Further to the activation of the aforementioned CAI and CRE procedures, primary mechanisms for providing traffic flow control and secondary mechanisms for providing additional fine adjustment respectively, there may be needs for a partial or complete deactivation of said CAI and CRE procedures. As already commented for previous embodiments, all these flow control mechanisms are not established on individual call basis but rather on nodal capacity basis. Consequently, there is no apparent need to negotiate the corresponding features at every call, transaction, or message request. That is why the negotiation of traffic flow control related features has been preferably suggested during the registration periods, though other SIP methods and messages may be applied as well. However, the REGISTER requests are additive in the sense that features provided by a certain registration do not completely replace all earlier ones. On the other hand, another possibility already suggested for the initial negotiation and further re-negotiations is the OPTIONS method. In this respect, any OPTIONS request represents a flow control negotiation to establish a flow control context just valid until a next OPTIONS request is issued. Then, if every OPTIONS method were just used to query about new features, and assuming that those previously negotiated are still enabled, there would be no way to disable a previously negotiated feature. These are some reasons to justify the needs for a specific mechanism to deactivate CAI and CRE procedures and related features.

In accordance with a currently preferred embodiment another new SIP header is generally proposed for the deactivation of any feature related to said CAI and CRE procedures, and for which an exemplary format follows this: Deactivate= "Deactivate" ":" 1#option-tag Any SIP node, like the SIP-UA or the SIP-Proxy for instance, wanting to deactivate any flow control related feature may just include this 'Deactivate' header in any SIP message to the opposite node indicating said particular flow control related feature wanted to be deactivated. Said 'Deactivate' header may be used in a similar manner as the 'Supported' header, and may also be included in responses to any message request. In particular, said 'Deactivate' header might be included in any request from a SIP-UA, from a SIP-Proxy, and from a SIP-Server. Moreover, there is no apparent need to expect any response or confirmation from the receiver node prior to consider the indicated feature as deactivated.

In a first example illustrated in FIG. -9a-, all the flow control and fine adjustment related features might be deactivated in just one step from a SIP node, like a SIP-Proxy, by including all of them in a 'Deactivate' header in any SIP message to be submitted to another SIP node like a SIP-UA. In a second example illustrated in FIG. -9b-, just features related to flow control and fine adjustment in a single direction. This FIG. -9b- shows how a SIP-UA deactivates the flow control and fine adjustment related features in the direction from the SIP-Proxy to the SIP-UA by including them in a 'Deactivate' header in any SIP message to be submitted from said SIP-UA to said SIP-Proxy. In this situation, the corresponding features in the other direction from SIP-UA to SIP-Proxy remain unchanged. A third example in FIG. -9c- shows how the flow control and fine adjustment related features might be deactivated from any SIP node of a couple of SIP nodes implementing these primary and secondary traffic flow control mechanisms in any order. As shown in FIG. -9c-, a SIP-Proxy deactivates the flow control related feature in the direction from the SIP-Proxy to the SIP-UA by including it in a 'Deactivate' header in any SIP message to be submitted from said SIP-Proxy to said SIP-UA. Further, the SIP-UA deactivates the flow control and fine adjustment related features in the direction from the SIP-UA to the SIP-Proxy by including them in a 'Deactivate' header in any SIP message to be submitted from said SIP-UA to said SIP-Proxy. Eventually, the former SIP-Proxy deactivates the remaining fine adjustment related feature in the direction from the SIP-UA to the SIP-Proxy by including it in a 'Deactivate' header in another SIP message to be submitted from said SIP-Proxy to said SIP-UA. Eventually, a fourth example in FIG. -9d- shows how each SIP node deactivates the flow control and fine adjustment related features in its own direction. That is, the SIP-UA deactivates flow control and fine adjustment features from the SIP-Proxy to said SIP-UA whereas the SIP-Proxy deactivates the same features from the SIP-UA to said SIP-Proxy.

As anyone skilled in the art may appreciate this approach, carried out by combination of 'Supported' and 'Deactivate' headers, might be used not only for these flow control purposes but also for any other feature-controlled service or function wherein a SIP node request the adjacent node the invocation of the indicated service or function by making use of a 'Supported' header whereas the requester or the adjacent node itself may disable such service or function by making use of the 'Deactivate' header.

After having fully explained the traffic flow control related mechanisms in a basic scenario comprising a couple of SIP nodes like a SIP-UA and a SIP-Proxy, other more general scenarios can be pointed out, said general scenarios comprising a plurality of nodes acting as SIP-UA and a plurality of nodes acting as SIP-Proxy. For instance, several SIP-UA are connected to the same SIP-Proxy, what is generally known nowadays in SIP Specifications as an Outbound Proxy, or a single SIP-UA is connected to more than one SIP-Proxy, what results in different routes to or from the SIP network. Moreover, the most general scenario wherein more than one SIP-UA are connected to more than one SIP-Proxy is shown in FIG. -10- and reflects the actual flexibility as registering at least one of a plurality of SIP-UA into a SIP network to provide access for a bunch of users to those services available in said SIP network.

The case in FIG. -10- where a single SIP-Proxy (SIP Proxy-1) has got registrations from more than one SIP-UA (SIP UA-1, SIP UA-2, SIP UA-3, SIP UA-N) deserves some extra considerations apart from what has been hereinbefore described. Said considerations may add particular details to every specific implementation, but do not present relevant impacts to the CAI and CRE procedures in accordance with the invention. In this respect, a SIP-Proxy must be able to handle the aforementioned CAI and CRE procedures for the amount of SIP-UA having registered. For this purpose, SIP-Proxy is still able to measure its own total traffic capabilities, accommodating and distributing such figures amongst the amount of SIP-UA. Moreover, said SIP-Proxy may decide whether the traffic to or from certain SIP-UA needs to be under some more rigorous control. Further, said SIP-Proxy may distribute its total traffic handling capacity between some or all the existing SIP-UA connections by using predetermined or dynamically configured criteria. For example, a first generic criterion may be the support of SIP-UA priority lists on a per SIP-Proxy basis. Besides, other individual criteria might be the average traffic per SIP-UA, pre-defined minimum or maximum initial capacity assigned per SIP-UA, no initial capacity assigned and negotiation required for some particular SIP-UA for example, and many others as well as combinations thereof. Similar consideration as the preceding ones may be made in respect of the whole scenario presented in FIG. -10- wherein a plurality of SIP-Proxies have got more than one SIP-UA registered with insignificant complexity that anyone of ordinary skill in the art may solve by extending this rational.

These embodiments above and varieties thereof are presented in an illustrative and non-restrictive manner in accordance with the present invention to accomplish the aforementioned Capacity Adjustment Indication (CAI) procedure, core part of traffic flow control mechanisms, and the aforementioned Capacity References Exchange (CRE) procedure, additional fine adjustment of traffic flow control mechanisms. It is expected that these embodiments may still be amended by anyone of ordinary skill in the art without substantially modifying the scope of the invention.

The invention claimed is:

1. A method for controlling traffic flow in a telecommunication network including a plurality of network nodes, each network node having a temporary different capacity limitation for handling signalling multimedia sessions over data networks, the method comprising the steps of:
    (a) negotiating between two network nodes whether a mechanism exist in both nodes for controlling the traffic flow between said nodes in both directions, from a traffic sender node to a traffic receiver node;
    (b) determining the capacity limitation of at least one traffic receiver node; and
    (c) accommodating the traffic load between the traffic sender node and the traffic receiver node to the capacity limitation of the traffic receiver node;
    (d) negotiating between said two network nodes whether a capacity reference exchange (CRE) mechanism exist in both nodes for establishing maximum reference limits for the traffic flow between them in both directions, said negotiation being initiated at any one of said nodes;
    (e) using a CRE mechanism for establishing a maximum reference limit for the traffic flow between said nodes in at least one direction of the traffic flow, including the following steps:
        (e1) determining at each node the maximum traffic load that said node supports for sending to, or receiving from, the other node in said direction of the traffic flow; and
        (e2) both nodes exchanging their respective capacity references (Capacity-profile) in said direction of the traffic flow, said references including when applicable the maximum traffic load in the incoming or outgoing direction, and the units in which traffic is measured;
    wherein the mechanism is a capacity adjustment indication CAI mechanism and the negotiation in the above step a) includes the steps of:
        (a1) indicating from a requester to a requested node of said network nodes at least one traffic flow direction for which the capacity adjustment indication mechanism is supported in the requester node;
        (a2) answering from the requested to the requester node whether the CAI mechanism for said traffic flow direction is also supported in the requested node; and
        (a3) marking at the requester and requested nodes any traffic flow direction for which a CAI mechanism is supported in both nodes.

2. A method according to claim 1, wherein the capacity limitation in the above step b) is determined by a capacity adjustment indication received at the traffic sender node from the traffic receiver node when corresponding traffic flow direction is supported in both nodes.

3. A method according to claim 2, wherein said capacity adjustment indication sent from the traffic receiver node to the traffic sender node includes:
    information about the maximum incoming traffic load that said traffic receiver node is able to deal with from said traffic sender node; and the units (calls/s) in which traffic is measured.

4. A method according to claim 1, wherein the step d) of negotiating includes the steps of:
    (d1) indicating from a requester to a requested node of said network nodes at least one traffic flow direction for which a CRE mechanism is supported in the requester node;
    (d2) answering from the requested to the requester node whether said CRE mechanism for said traffic flow direction is also supported in the requested node; and
    (d3) marking at the requester and requested nodes any traffic flow direction for which a CRE mechanism is supported in both nodes.

5. A method according to claim 1, wherein the step e2) of exchanging respective capacity references comprises the steps of:
    (e2-a) proposing from a requester to a requested node the capacity reference (Capacity-profile) determined at said requester node for said direction of the traffic flow, said capacity reference including when applicable the maximum traffic load in the incoming or outgoing direction, and the units in which traffic is measured;
    (e2-b) checking at the requested node whether said capacity reference received from the requester node is being supported or a lower capacity reference value is being granted to said requester node;
    (e2-c) granting from the requested to the requester node a capacity reference supported by both nodes;
    (e2-d) storing at both requester and requested nodes the capacity reference supported by both nodes.

6. A method according to claim 1, wherein the multimedia sessions are signalled by a protocol operating in accordance with a Session Initiation Protocol.

7. A method according to claim 6, wherein the requester node indicates during negotiation the at least one traffic flow direction for which a CAI mechanism is supported by making use of a 'Supported' header including indications of specific supported traffic flow directions.

8. A method according to claim 6, wherein the requested node answers during negotiation of the CAI mechanism by returning a successful acknowledge, said acknowledge either with an 'Unsupported' header including unsupported traffic flow directions from those received, or with no header where the received traffic flow directions are supported.

9. A method according to claim 6, wherein:
    the requester node indicates during negotiation the at least one traffic flow direction for which a CRE mechanism is supported by making use of a 'Supported ' header including indications of specific supported traffic flow directions; and
    the requested node answers during negotiation of the CRE mechanism by returning a successful acknowledge, said acknowledge either with an 'Unsupported' header including unsupported traffic flow directions from those received, or with no header where the received traffic flow directions are supported.

10. A method according to claim 6, wherein the capacity adjustment indications are sent by making use of a so-called 'Capacity-adjust' header comprising parameters for incoming traffic load information in respect of a given maximum reference limit, and the units in which said traffic load is measured.

11. A method according to claim 6, wherein the capacity references are sent by making use of a so-called 'Capacity-profile' header comprising parameters for the maximum traffic load in the incoming direction, and for the maximum traffic load in the outgoing direction acceptable to and from a certain network node.

12. A method according to claim 1, wherein at least one network node is a node selected from a group of nodes comprising:
   a node acting as a Session Initiation Protocol User Agent (SIP UA);
   a node acting as a Session Initiation Protocol Proxy (SIP Proxy);
   a node acting as a Session Initiation Protocol Server; and
   a Media Gateway controller (MGC) acting as a Session Initiation Protocol User Agent (SIP UA).

13. A telecommunications system comprising
   a first media domain (SIP Domain) wherein multimedia sessions are signalled by a protocol operating according to a Session Initiation Protocol;
   a second media domain (Telephony Domain) wherein multimedia sessions are signalled by a protocol operating according to a second standard;
   a Media Gateway (MGW) in charge of receiving and sending media between said first and second media domains;
   a Media Gateway Controller for receiving and sending signalling related to multimedia sessions from and to network nodes in said first and second media domains, and having at least two connected nodes carrying out a negotiation to agree on whether a mechanism exists in both nodes for controlling the traffic flow between them in at least one of both directions, wherein the mechanism is a capacity adjustment indication CAI mechanism and said negotiation between connected nodes being initiated at any one of said nodes and comprising:
      (a) a requester node indicating to each requested node at least one traffic flow direction for which the capacity adjustment indication mechanism is supported in the requester node;
      (b) the requested node answering to the requester node whether said CAI mechanism for said traffic flow direction is also supported in the requested node; and
      (c) both requester and requested nodes marking on a per requester and requested basis any traffic flow direction for which a CAI mechanism is supported in both nodes,
   wherein the two connected nodes carry out a second negotiation to agree on whether capacity reference exchange (CRE) mechanisms exist in both nodes for establishing maximum reference limits for the traffic flow in at least one of both directions, said negotiation being initiated at any one of said nodes and further comprising:
      (d) a requester node indicating to a requested node at least one traffic flow direction for which a CRE mechanism is supported in the requester node;
      (e) the requested node answering to the requester node whether said CRE mechanism for said traffic flow direction is also supported in the requested node; and
      (f) both requester and requested nodes marking on a per requester and requested basis any traffic flow direction for which a CRE mechanism is supported in both nodes.

14. A telecommunications system according to claim 13, wherein the requester node has agreed during negotiation with the requested node on both nodes supporting a CAI mechanism for flow control from a traffic sender node to a traffic receiver node, said traffic receiver node having:
   (a) means for determining its capacity limitation available for traffic incoming from said traffic sender node; and
   (b) means for sending a capacity adjustment indication to said traffic sender node for accommodating the traffic flow toward the traffic receiver node according to the capacity limitations in the traffic receiver node.

15. A telecommunications system according to claim 13, wherein the requester node has agreed during said second negotiation with the requested node on both nodes supporting a CRE mechanism for establishment of a maximum reference limit for the traffic flow in at least one traffic flow direction between said nodes,
   (a) each node having means for determining the maximum traffic load that said node supports for sending to, or receiving from, the other node in said traffic flow direction, and
   (b) both nodes having means for exchanging their respective capacity references in said traffic flow direction, including the maximum traffic load in the incoming or outgoing direction, and the units in which traffic is measured.

16. A telecommunications system according to claim 15, wherein the means for exchanging respective capacity references for the traffic flow in at least one traffic flow direction, comprises:
   (b1) means for proposing from the requester node to the requested node the capacity reference determined at said requester node for said traffic flow direction, said capacity reference including when applicable the maximum traffic load in the incoming or outgoing direction, and the units in which traffic is measured;
   (b2) the requested node checking whether said capacity reference received from the requester node is being supported or a lower capacity reference is being granted to said requester node;
   (b3) the requested node granting to the requester node a capacity reference supported by both nodes; and
   (b4) both requester and requested nodes storing the capacity reference supported by both nodes.

17. A telecommunications system according to claim 13, wherein at least one node in said telecommunications system is a node selected from a group of nodes comprising:
   a node acting as a Session Initiation Protocol User Agent (SIP UA);
   a node acting as a Session Initiation Protocol Proxy (SIP Proxy);
   a node acting as a Session Initiation Protocol Server; and
   a Media Gateway Controller (MGC) acting as a Session Initiation Protocol User Agent (SIP UA).

18. A Media Gateway Controller for exchanging signalling traffic related to multimedia sessions with a network node of a media domain wherein the multimedia sessions are signalled by a protocol operating according to a Session Initiation Protocol, the Media Gateway Controller comprising:
   (a) first protocol means for negotiating with the network node whether a mechanism exist for controlling the traffic flow between them in both directions from a traffic sender node to a traffic receiver node;
   (b) first processing means for determining capacity limitations of at least one traffic receiver node; and
   (c) traffic limitation means for accommodating the traffic load between the traffic sender node and the traffic receiver node to the capacity limitation of the traffic receiver node;
   (d) second protocol means for negotiating with the network node whether a capacity reference exchange (CRE) mechanism exists for establishing maximum reference limits for the traffic flow between them in both directions from a traffic sender node to a traffic receiver node; and (e) second processing means for determining capacity references that each node supports for sending to, or receiving from, the other node in at least one direction of the traffic flow;

wherein said first protocol means a) further comprises:
- (a1) means for indicating to the network node at least one traffic flow direction for which a capacity adjustment indication (CAI) mechanism is supported in the Media Gateway Controller;
- (a2) means for receiving an indication from the network node of at least one traffic flow direction for which a capacity adjustment indication (CAI) mechanism is supported in said network node; and
- (a3) means for marking any traffic flow direction for which the CAI mechanism is supported in both Media Gateway Controller and network node.

wherein the second protocol means d) includes:
- (d1) means for indicating to the network node at least one traffic flow direction for which a CRE mechanism is supported in the Media Gateway Controller;
- (d2) means for receiving an indication from the network node of at least one traffic flow direction for which a CRE mechanism is supported in said network node; and
- (d3) means for marking any traffic flow direction for which the CRE mechanism is supported in both Media Gateway Controller and network node.

19. A Media Gateway Controller according to claim 18, wherein the first processing means b) comprises:
- (b1) means for sending a capacity adjustment indication to the network node when both Media Gateway Controller and network node support the CAI mechanism in the traffic flow direction towards the Media Gateway Controller; and
- (b2) means for receiving a capacity adjustment indication from the network node when both Media Gateway Controller and network node support the CAI mechanism in the traffic flow direction towards the network node.

20. A Media Gateway Controller according to claim 18, wherein the second processing means e) includes:
- (e1) means for sending a capacity reference to the network node when both Media Gateway Controller and network node support the CRE mechanism in the traffic flow direction towards the Media Gateway Controller; and
- (e2) means for receiving a capacity reference from the network node when both Media Gateway Controller and network node support the CRE mechanism in the traffic flow direction towards the network node.

21. A proxy node of a media domain for exchanging signaling traffic related to multimedia sessions with a user agent node, the multimedia sessions being signaled by a protocol operating according to a Session Initiation Protocol, the proxy node comprising:
- (a) first protocol means for negotiating with the user agent node whether a mechanism exist for controlling the traffic flow between them in both directions from a traffic sender node to a traffic receiver node;
- (b) first processing means for determining capacity limitations of at least one traffic receiver node; and
- (c) traffic limitation means for accommodating the traffic load between the traffic sender node and the traffic receiver node to the capacity limitation of the traffic receiver node;
- (d) second protocol means for negotiating with the user agent node whether a capacity reference exchange (CRE) mechanism exists for establishing maximum reference limits for the traffic flow between them in both directions from a traffic sender node to a traffic receiver node; and
- (e) second processing means for determining capacity references that each node supports for sending to, or receiving from, the other node in at least one direction of the traffic flow;

wherein said first protocol means a) further comprises:
- (a1) means for indicating to the user agent node at least one traffic flow direction for which a capacity adjustment indication (CAI) mechanism is supported in the proxy node;
- (a2) means for receiving an indication from the user agent node of at least one traffic flow direction for which a capacity adjustment indication (CAI) mechanism is supported in said user agent node; and
- (a3) means for marking any traffic flow direction for which the CAI mechanism is supported in both user agent node and proxy node;

wherein the second protocol means d) includes:
- (d1) means for indicating to the user agent node at least one traffic flow direction for which a CRE mechanism is supported in the proxy node;
- (d2) means for receiving an indication from the user agent node of at least one traffic flow direction for which a CRE mechanism is supported in said user agent node; and
- (d3) means for marking any traffic flow direction for which the CRE mechanism is supported in both user agent node and proxy node.

22. A proxy node according to claim 21, wherein the first processing means b) comprises:
- (b1) means for sending a capacity adjustment indication to the user agent node (SIP UA) when both user agent node and proxy node support the CAI mechanism in the traffic flow direction towards the proxy node; and
- (b2) means for receiving a capacity adjustment indication from the user agent node when both user agent node and proxy node support the CAI mechanism in the traffic flow direction towards the user agent node.

23. A proxy node according to claim 21, wherein the second processing means e) includes:
- (e1) means for sending a capacity reference to the user agent node when both user agent node and proxy node support the CRE mechanism in the traffic flow direction towards the proxy node; and
- (e2) means for receiving a capacity reference from the user agent node when both user agent node and proxy node support the CRE mechanism in the traffic flow direction towards the user agent node.

* * * * *

UNITED STATES PATENT AND TRADEMARK OFFICE
CERTIFICATE OF CORRECTION

PATENT NO. : 7,489,634 B2
APPLICATION NO. : 10/498749
DATED : February 10, 2009
INVENTOR(S) : Sanchez Cembellin et al.

It is certified that error appears in the above-identified patent and that said Letters Patent is hereby corrected as shown below:

On the Title Page, in Field (57), under "ABSTRACT", in Column 2, Line 4, delete "senario" and insert -- scenario --, therefor.

Title Page 2, in Field (56), under "OTHER PUBLICATIONS", in Column 2, Line 5, delete "Heterogenous" and insert -- Heterogeneous --, therefor.

In Column 2, Line 12, delete "networks," and insert -- networks. --, therefor.

In Column 5, Line 28, delete "A second embodiment of the present invention provides a" and insert -- The present invention also provides a --, therefor.

In Column 5, Line 39, delete "Domains." and insert -- Domains, that is, from and to network nodes in said first and second Media Domains. --, therefor.

In Column 5, below Line 52, insert paragraph -- In the preferred scenario........ a SIP-Proxy node. --.

In Column 22, Line 1, in Claim 3, delete "node is able to deal with from said traffic sender node; and" and insert the same in Column 21, Line 67, after "traffic receiver" as a continuation.

In Column 23, Line 12, in Claim 12, delete "controller" and insert -- Controller --, therefor.

In Column 25, Line 16, in Claim 18, delete "node." and insert -- node; --, therefor.

Signed and Sealed this

Twenty-seventh Day of October, 2009

David J. Kappos
*Director of the United States Patent and Trademark Office*